United States Patent
Kriegel et al.

(10) Patent No.: US 9,051,116 B2
(45) Date of Patent: *Jun. 9, 2015

(54) CONTAINER AND COMPOSITION FOR ENHANCED GAS BARRIER PROPERTIES

(71) Applicant: The Coca-Cola Company, Atlanta, GA (US)

(72) Inventors: Robert Kriegel, Decatur, GA (US); Xiaoyan Huang, Marietta, GA (US); Robert Schiavone, Matthews, NC (US); T. Edwin Freeman, Woodstock, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/228,932

(22) Filed: Mar. 28, 2014

(65) Prior Publication Data

US 2014/0212611 A1 Jul. 31, 2014

Related U.S. Application Data

(63) Continuation of application No. 12/629,379, filed on Dec. 2, 2009, now abandoned.

(60) Provisional application No. 61/121,036, filed on Dec. 9, 2008.

(51) Int. Cl.
*C08K 5/103* (2006.01)
*B65D 85/72* (2006.01)
(Continued)

(52) U.S. Cl.
CPC .......... *B65D 85/72* (2013.01); *Y10T 428/1379* (2015.01); *C08K 5/10* (2013.01); *B65D 1/0207* (2013.01); *C08K 5/12* (2013.01); *C08K 5/103* (2013.01)

(58) Field of Classification Search
CPC ............. C08K 5/10; C08K 5/103; C08K 5/12
USPC ........................................................ 524/287
See application file for complete search history.

(56) References Cited

U.S. PATENT DOCUMENTS 4,161,579 A 7/1979 Edelman et al.
4,223,128 A 9/1980 Halek et al.
(Continued)

FOREIGN PATENT DOCUMENTS

CN 1368929 A 9/2002
CN 101193947 A 6/2008
(Continued)

OTHER PUBLICATIONS

Complaint filed Jun. 19, 2012 in the U.S. District Court of South Carolina Greenville Division *Ethox Chemicals LLC and James Tanner* v. *The Coca-Cola Company* 6:12-cv-01682-TMC.
(Continued)

*Primary Examiner* — Michael Pepitone
(74) *Attorney, Agent, or Firm* — Sutherland Asbill & Brennan LLP

(57) ABSTRACT

A container comprising a polyester composition with enhanced carbon dioxide and oxygen barrier properties is provided. The polyester composition comprises a polyester and a gas barrier enhancing additive. In a particular embodiment, the gas barrier enhancing additive comprises a compound having the chemical formula:

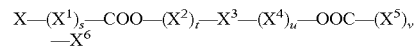

or

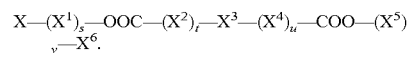

14 Claims, 5 Drawing Sheets

(51) Int. Cl.
    *C08K 5/10* (2006.01)
    *B65D 1/02* (2006.01)
    *C08K 5/12* (2006.01)

(56) References Cited

U.S. PATENT DOCUMENTS

| | | | |
|---|---|---|---|
| 4,609,721 A | | 9/1986 | Kirshenbaum et al. |
| 4,705,844 A | * | 11/1987 | Espenschied et al. ........ 528/275 |
| 5,438,031 A | | 8/1995 | Shinohara et al. |
| 5,473,161 A | | 12/1995 | Nix et al. |
| 5,888,598 A | | 3/1999 | Brewster et al. |
| 5,902,864 A | | 5/1999 | Al Ghatta et al. |
| 5,939,516 A | | 8/1999 | Greaves et al. |
| 6,077,891 A | | 6/2000 | Herbst et al. |
| 6,150,454 A | | 11/2000 | Wu et al. |
| 6,350,822 B1 | | 2/2002 | Van Diepen et al. |
| 6,365,247 B1 | | 4/2002 | Cahill et al. |
| 6,441,104 B1 | | 8/2002 | Ishida |
| 6,447,711 B1 | | 9/2002 | Al Ghatta et al. |
| 6,489,386 B1 | | 12/2002 | Plotzker et al. |
| 6,500,890 B2 | | 12/2002 | Edwards et al. |
| 6,558,762 B2 | | 5/2003 | Cahill et al. |
| 7,081,511 B2 | | 7/2006 | Wu et al. |
| 7,094,863 B2 | | 8/2006 | Moore et al. |
| 7,144,632 B2 | | 12/2006 | Hayes |
| 7,144,972 B2 | | 12/2006 | Hayes |
| 7,193,029 B2 | | 3/2007 | Hayes |
| 7,892,713 B2 | | 2/2011 | Weiss et al. |
| 8,110,265 B2 | * | 2/2012 | Kriegel et al. ............... 428/36.6 |
| 8,685,511 B2 | * | 4/2014 | Kriegel et al. ............... 428/35.7 |
| 2002/0004578 A1 | | 1/2002 | Shelby et al. |
| 2002/0086154 A1 | | 7/2002 | Miller et al. |
| 2003/0228479 A1 | | 12/2003 | Shelby et al. |
| 2004/0116619 A1 | | 6/2004 | Moad et al. |
| 2005/0171250 A1 | | 8/2005 | Hayes |
| 2005/0221036 A1 | | 10/2005 | Shi |
| 2006/0009609 A1 | | 1/2006 | Hayes |
| 2006/0199919 A1 | | 9/2006 | Hale et al. |
| 2006/0275568 A1 | * | 12/2006 | Shi et al. ...................... 428/35.7 |
| 2006/0287496 A1 | | 12/2006 | Crawford et al. |
| 2006/0293416 A1 | | 12/2006 | Peeters et al. |
| 2007/0082156 A1 | | 4/2007 | Shi et al. |
| 2008/0071009 A1 | | 3/2008 | Simon |
| 2008/0093777 A1 | | 4/2008 | Sequeira et al. |
| 2008/0177010 A1 | | 7/2008 | Cavaglia |
| 2008/0274316 A1 | | 11/2008 | Griffith et al. |
| 2009/0017320 A1 | | 1/2009 | Donelson et al. |
| 2009/0198022 A1 | | 8/2009 | Nichols et al. |

FOREIGN PATENT DOCUMENTS

| | | |
|---|---|---|
| EP | 666285 E | 9/2000 |
| EP | 1470175 A1 | 10/2004 |
| WO | 96/40821 A1 | 5/1996 |
| WO | 01/12521 A1 | 2/2001 |
| WO | 01/92007 A1 | 12/2001 |
| WO | 2007/106302 A1 | 9/2007 |

OTHER PUBLICATIONS

Disclosure Under 37 C.F.R. 1.56 for U.S. Appl. No. 12/629,657 submitted Jun. 2, 2010.

Disclosure Under 35 C.F.R. 1.56 for U.S. Appl. No. 13/344,318 submitted Feb. 27, 2013.

Dubey, et al., Ind. J. Heterocycl. Chem. 2005, 14, 301-306.

SciFinder Structural Search for bis(2-(benzoyloxy)ethyl) terephthalate, Jan. 2008.

* cited by examiner

CONTAINER AND COMPOSITION FOR ENHANCED GAS BARRIER PROPERTIES

CROSS-REFERENCE TO RELATED APPLICATIONS

This application is a continuation of copending U.S. Application Serial No. 12/629,379, filed on Dec. 2, 2009, now abandoned, which claims benefit of U.S. Provisional Application No. 61/121,036, filed Dec. 9, 2008. These applications are incorporated herein by reference in their entireties.

FIELD OF THE INVENTION

This invention relates to a packaged beverage, and more particularly to enhancing the carbon dioxide and oxygen barrier properties of a container for a packaged beverage, thereby increasing the shelf life of its contents, by incorporating an additive into polyethylene terephthalate (PET) and its copolyesters.

BACKGROUND

Polyethylene terephthalate and its copolyesters (hereinafter referred to collectively as "PET") are widely used to make containers for carbonated soft drinks, juice, water, and the like due to their excellent combination of clarity, mechanical, and gas barrier properties. In spite of these desirable characteristics, oxygen and carbon dioxide gas barrier properties of PET limit application of PET for smaller sized packages, as well as for packaging oxygen sensitive products, such as beer, juice, and tea products. A widely expressed need exists in the packaging industry to further improve the gas barrier properties of PET.

The relatively high permeability of PET to carbon dioxide limits the use of smaller PET containers for packaging carbonated soft drinks. The permeation rate of carbon dioxide through PET containers is in the range of 3 to 14 cc's per day or 1.5 to 2 percent per week loss rate at room temperature depending on the size of the container. A smaller container has a larger surface area to volume ratio resulting in a higher relative loss rate. For this reason, PET containers are currently used only as larger containers for packaging carbonated soft drinks, while metal cans and glass containers are the choice for smaller carbonated soft drink containers.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5 percent of the carbon dioxide in the container is lost due to permeation of the carbon dioxide through the container side wall and closure. The permeability of PET to carbon dioxide therefore determines the shelf life of the packaged carbonated beverage and thus, the suitability of PET as a packaging material.

Numerous technologies have been developed or are being developed to enhance the barrier of PET to small gas molecules, but some are too expensive and others may cause undesirable change in PET mechanical properties, stretch ratio, and/or clarity.

Thus, there is a need in the art to enhance the barrier performance of PET for use in applications that will require enhanced barrier, such as in the packaging of carbonated beverages and oxygen sensitive beverages and foods, in a manner that does not cause substantial degradation of the PET mechanical properties, does not substantially impact the stretch ratio of the PET, and/or does not negatively impact the clarity of the PET.

SUMMARY

The embodiments provided herein address the above-described needs by providing a polyester container with enhanced gas barrier properties. The polyester container comprises a polyester composition comprised of a polyester and a gas barrier enhancing additive. In an embodiment, the gas barrier enhancing additive comprises a compound having the chemical structure of Formula I or Formula II:

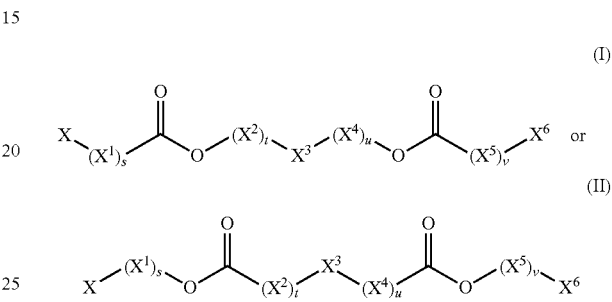

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which may be unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon may be unsubstituted or substituted with one or more functional moieties or one or more $C_1$-$C_{10}$ hydrocarbyls that may be unsubstituted or substituted with one or more functional moieties; and wherein s, t, u, and v, independent of one another, may be a number from 0 to 10;

wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon which may be unsubstituted or substituted with one or more functional moieties.

According to another embodiment, a method for enhancing gas barrier properties of a polyester container is provided, the method comprising blending a polyester with such a gas barrier enhancing additive to form a polyester composition. According to particular embodiments, the polyester composition can be formed into articles such as a container.

Furthermore, in another embodiment, the step of forming the container comprises stretch blow molding. Particular embodiments provide polyester containers, such as PET containers, with enhanced gas barrier, and in particular, enhanced gas barrier to carbon dioxide and oxygen. This makes certain embodiments particularly suited for packaging carbonated soft drinks and oxygen sensitive beverages and foods. Particular embodiments may achieve this enhanced gas barrier while maintaining acceptable physical properties and clarity.

Other objects, features, and advantages of this invention will become apparent from the following detailed description, drawings, and claims.

DETAILED DESCRIPTION

Figure 1:
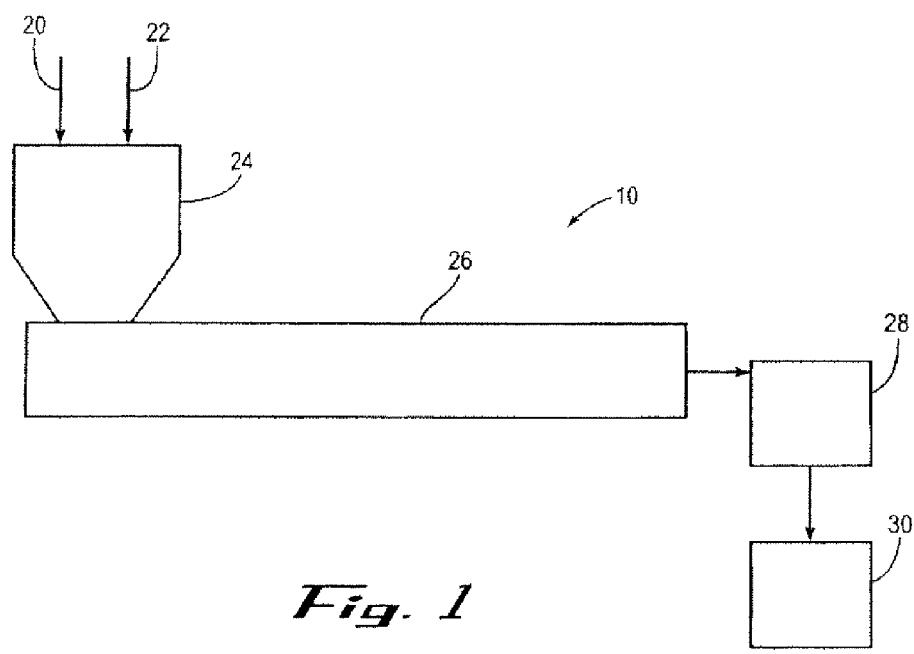
FIG. 1 is a schematic diagram of a system for making a PET container with enhanced gas barrier in accordance with an embodiment.

A polyester container with enhanced gas barrier properties and a method for making a polyester container with enhanced gas barrier properties are provided herein. Generally described, the polyester container comprises a polyester composition comprising a polyester and a gas barrier enhancing additive having the chemical structure of Formula I or Formula II:

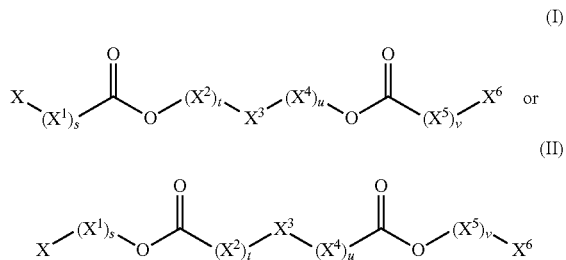

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which may be unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or which may be unsubstituted or substituted with one or more functional moieties or one or more $C_1$-$C_{10}$ hydrocarbyls that may be unsubstituted or substituted with one or more functional moieties; and wherein s, t, u, and v, independent of one another, may be a number from 0 to 10;

wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon which may be unsubstituted or substituted with one or more functional moieties.

Polyester containers and methods for making such containers made in accordance with the embodiments provided herein are further described below and in accompanying FIGS. 1-7.

I. Polyester Composition

The polyester compositions and containers provided herein may be applicable to any polyester and may be suitable for uses in which a high gas barrier is desirable. Non-limiting examples of suitable polyesters for use in the embodiments provided herein include PET copolymers, polyethylene naphthalate (PEN), polyethylene isophthalate, and the like. PET copolymers are particularly useful because they are used for many barrier applications, such as films and containers. Suitable containers include, but are not limited to, bottles, drums, carafes, coolers, and the like.

Polyesters, including PET copolymers, have free volume between the polymer chains. As is known to those skilled in the art, the amount of free volume in polyesters, such as PET copolymers, determines their barrier to gas molecules. The lower the free volume, the lower the gas diffusion, and the higher the barrier to gas molecules. Desirably, the gas barrier enhancing additive is at least partially disposed in the free volume of the polyester between the polyester chains.

PET copolymers suitable for use in embodiments of this invention may comprise a diol component having repeat units from ethylene glycol and a diacid component having repeat units from terephthalic acid. In particular embodiments, the PET copolymer has less than 20 percent diacid modification, less than 10 percent glycol modification, or both, based on 100 mole percent diacid component and 100 mole percent diol component. Such PET copolymers are well known.

The polyester may be made using any suitable polycondensation catalysts; however, Applicants previously discovered that specific polycondensation catalysts may be particularly suited for use with gas barrier enhancing additives. Such polycondensation catalysts are disclosed in U.S. Patent Publication No. 2006/0275568. In one embodiment, the polyester may be made using at least one first polycondensation catalyst selected from the group consisting of metals in groups 3, 4, 13, and 14 of the Periodic Table. The polyester composition may comprise a catalyst residue remaining in the polyester from formation of the polyester and the catalyst residue may comprise at least a portion of the at least one first polycondensation catalyst. In some embodiments, the catalyst residue may be present in the polyester composition in an amount up to 250 ppm, and is preferably less.

The gas barrier enhancing additive and the polyester may undergo a transesterification reaction and thereby cause problems in container applications, such as lowering the I.V. of the polyester composition to unacceptable levels. Transesterification reaction in PET copolymer resin is believed to be catalyzed by the residual polycondensation catalyst. Accordingly, in one embodiment the residual polycondensation catalyst in the polyester may be deactivated. One approach to deactivating these catalysts has been to add catalyst deactivating compounds, such as phosphorus containing compounds, to the polyester composition. Once the catalysts are deactivated, they will not catalyze the transesterification reaction and such reaction will be slowed down during the melt processing of the polyester, such as PET copolymer, and gas barrier enhancing additive blend. The phosphorus containing compounds include both organic and inorganic compounds. Examples include but are not limited to phosphoric acid, polyphosphoric acid, and tris(2,4-di-t-butylphenyl) phosphite, tris mononoylphenyl phosphite.

The polycondensation catalyst deactivating agent optionally may be added to the polyester composition in an amount sufficient to deactivate the polycondensation catalyst residue in the polyester composition so that the gas barrier enhancing additive is able to sufficiently enhance the gas barrier properties of the polyester composition and the resulting polyester container. For example, these additives may be added to the polyester composition in amounts less than 2000 ppm. In accordance with one embodiment, the polycondensation catalyst deactivating agent may be present in the polyester composition in amount from about 10 to about 500 ppm by weight of the polyester composition or in an amount from about 100 to about 500 ppm by weight of the polyester composition.

Despite the addition of the polycondensation deactivating agents, the extent of the deactivation of the polycondensation remains unclear and may not be sufficient to eliminate the degradation of the polyester through reaction with the barrier enhancing additives when certain polycondensation catalysts are used in the formation of the polyester by polycondensation reaction. Accordingly, in other embodiments the polyester composition may comprise a second polycondensation catalyst selected from the group consisting of cobalt, antimony, zinc, manganese, magnesium, cesium, calcium, and cadmium. Those skilled in the art should appreciate that the amount of the second polycondensation catalyst which is present in the polyester composition should be maintained below levels which may significantly lower the I.V. of the polyester composition below acceptable levels. Accordingly, in one embodiment the second polycondensation catalyst may be present in the polyester composition in an amount up to 3 ppm of the polyester composition. Specifically, the reactivity of traditional polycondensation catalysts such as cobalt, antimony, zinc, manganese, magnesium, cesium, calcium, calcium, and cadmium is not mitigated to the extent necessary to make use of the phosphorus-based deactivating agents a viable alternative compared to substantial reduction or elimination of the metal catalyst residues containing cobalt, antimony, zinc, manganese, magnesium, cesium, calcium, or cadmium.

Reaction between the gas barrier enhancing additive and the polyester composition can reduce the I.V. of the polyester composition and resulting container preform. PET with a significantly lower I.V. cannot be used in blow molding containers, such as beverage containers, because lower I.V. PET makes containers with poor mechanical performance, such as creep, drop impact resistance, and the like. Still further, PET containers made from lower I.V. PET generally have poor stress cracking resistance for carbonated soft drink applications, which is undesirable in container applications. In order to prepare container preforms and containers with adequate physical properties and an I.V. suitable for efficient molding of the preforms and blow molding of such preforms into containers, the polyester composition desirably has an I.V. of at least 0.65, more preferably from about 0.65 to about 1.0, and even more preferably from about 0.70 to about 0.86. The units for I.V. herein are all in dL/g measured according to ASTM D4603-96, in which the I.V. of PET based resin is measured at 30° C. with 0.5 weight percent concentration in a 60/40 (by weight) phenol/1,1,2,2-tetrachloroethane solution.

As discussed above, polyester having residual catalysts with minimal or no cobalt, antimony, zinc, manganese, magnesium, cesium, calcium, and cadmium substantially alleviates reduction in I.V. Total cobalt, antimony, zinc, manganese, magnesium, cesium, calcium, and cadmium content is desirably less than 3 ppm. According to a particular embodiment, suitable gas barrier enhancing additives for PET polymers and copolymers are blended with polyester having titanium and aluminum-based metal catalyst residues without the presence of residues containing cobalt, antimony, zinc, manganese, magnesium, cesium, calcium, or cadmium. The periodicity of the elements in the modern periodic table suggests that similar chemical reactivity exists throughout a group. As such, zirconium and halfnium may be useful as analogs for titanium catalysts, and gallium, indium, and thallium may be useful analogs of aluminum. Germanium, tin, and lead from group 14 may be suitable.

In a particular embodiment, a polyester composition comprises a polyester and a gas barrier enhancing additive, which is further described below. The gas barrier enhancing additive of the polyester composition enhances the gas barrier properties of the polyester composition at low loading levels, desirably in the range of about 0.1 to about 10 weight percent of the polyester composition, more desirably in the range of about 1 to about 6 weight percent of the polyester composition, and still more desirably in the range of about 2 to about 4 weight percent of the polyester composition. At low loading levels, a slight barrier improvement factor (BIF) occurs. Although the improvement in the BIF may be substantial at high loading levels, the physical properties of the PET deteriorate and make forming a container more difficult. The BIF is a measure of enhanced gas barrier properties (the ratio of the gas transmission rate of a polyester composition without an additive to the gas transmission rate of a polyester composition with an additive). The BIF that can be observed by the use of gas barrier enhancing additives provided herein can range from about 1.05 to greater than 2, with typical values of BIF being from about 1.15 to about 1.5.

According to an embodiment, the polyester composition comprises a polyester present in the polyester composition in an amount in the range of about 99.9 to about 90 weight percent of the polyester composition and a gas barrier enhancing additive present in the polyester composition in an amount in the range of about 0.1 to about 10 weight percent of the polyester composition.

In particular embodiments, the polyester compositions provided herein may further comprise a suitable creep control agent. Suitable creep control agents are known to those skilled in the art for enhancing mechanical properties of polyesters; however, Applicants have surprisingly discovered that the combination of creep control agents with the gas barrier enhancing additives provided herein further enhances the gas barrier properties of the polyester composition. Such creep control agents are further described below, and are described in detail in U.S. Pat. No. 8,110,265, the disclosure of which is incorporated herein by reference in its entirety.

II. Gas Barrier Enhancing Additives

The gas barrier enhancing additives provided herein generally comprise gas barrier additives having decreased volatility as compared to previously discovered gas barrier additives. As used herein, the terms "gas barrier enhancing additive," "gas barrier enhancement additive," and "gas barrier additive" are synonymous and may be used interchangeably.

In an embodiment, a gas barrier enhancing additive having the chemical structure of Formula I or Formula II is provided:

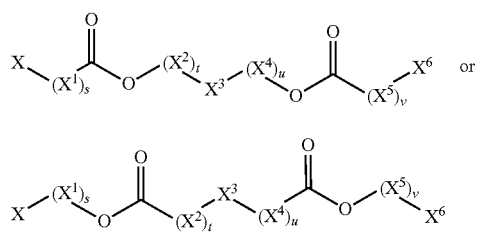

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which may be unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon may be unsubstituted or substituted with one or more functional moieties or one or more $C_1$-$C_{10}$ hydrocarbyls that may be unsubstituted or substituted with one or more functional moieties; and wherein s, t, u, and v, independent of one another, may be a number from 0 to 10.

In particular embodiments, when $X^3$ may comprise a $C_6$ or $C_{10}$ divalent aromatic hydrocarbon, X and $X^6$, independent of one another, may comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon which may be unsubstituted or substituted with one or more functional moieties.

In an embodiment of the compound of Formula I, wherein X and $X^6$ each comprise a phenyl group, the gas barrier additive comprises a compound having the chemical structure:

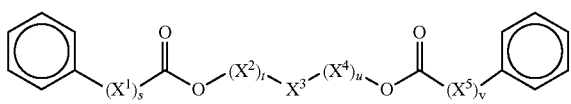

In an embodiment of the compound of Formula I, wherein X and $X^6$ each comprise a phenyl group and s and v are 0, the gas barrier additive comprises a compound having the chemical structure:

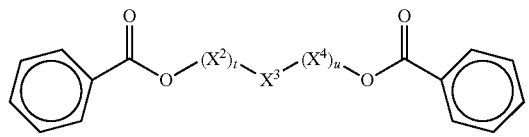

In an embodiment of the compound of Formula I, wherein X and $X^6$ each comprise a phenyl group and s, t, u, and v are 0, the gas barrier additive comprises a compound having the chemical structure:

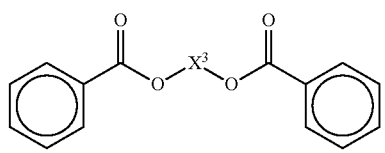

In an embodiment of the compound of Formula I, wherein X and $X^6$ each comprise a phenyl group, s, t, u and v are 0, and $X^3$ comprises a divalent isosorbide, the gas barrier additive comprises dibenzoyl isosorbide, a compound having the chemical structure:

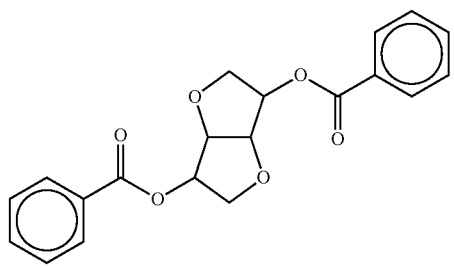

In an embodiment of the compound of Formula I, wherein X and $X^6$ comprise a phenyl group, s, t, u, and v are 0, and $X^3$ comprises a divalent cyclohexane, the gas barrier additive comprises a compound having the chemical structure:

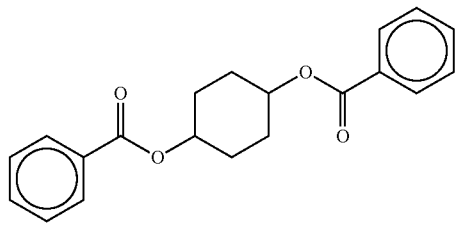

In an embodiment of the compound of Formula I, wherein X and $X^6$ each comprise a phenyl group, s and v are 0, t and u are 1, and $X^2$ and $X^4$ each comprise a divalent $C_1$ hydrocarbon, the gas barrier additive comprises a compound having the chemical structure:

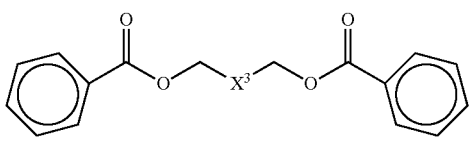

In an embodiment of the compound of Formula I, wherein X and $X^6$ each comprise a phenyl group, s and v are 0, t and u are 1, $X^2$ and $X^4$ each comprise a divalent $C_1$ hydrocarbon, and $X^3$ comprises a divalent hydro bi-furan, the gas barrier additive comprises a compound having the chemical structure:

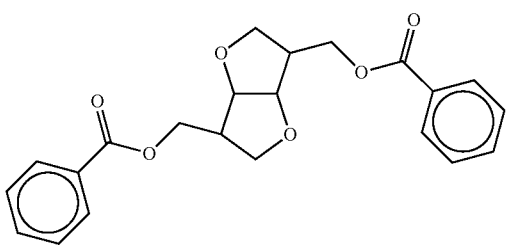

In an embodiment of the compound of Formula I, wherein X and $X^6$ comprise a phenyl group, s and v are 0, t and u are 1, $X^2$ and $X^4$ comprise a divalent $C_1$ hydrocarbon, and $X^3$ comprises a divalent cyclohexane, the gas barrier additive comprises a compound having the chemical structure:

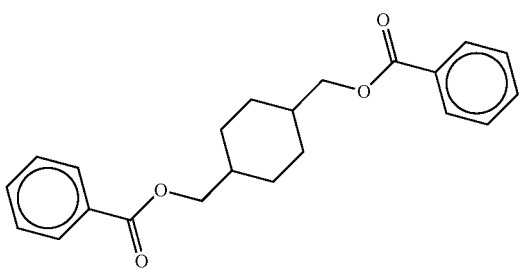

In an embodiment of the compound of Formula I, wherein X and $X^6$ each comprise a naphthyl group, the gas barrier additive comprises a compound having the chemical structure:

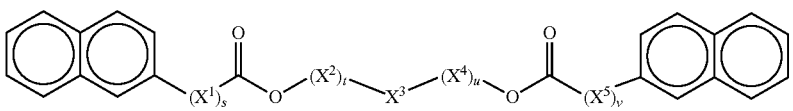

In an embodiment of the compound of Formula I, wherein X and $X^6$ each comprise a naphthyl group and s and v are 0, the gas barrier additive comprises a compound having the chemical structure:

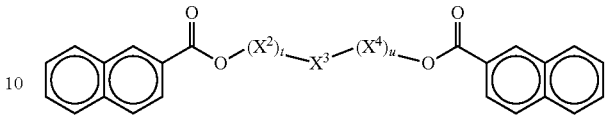

In an embodiment of the compound of Formula I, wherein X and $X^6$ each comprise a naphthyl group, s and v are 0, t and u are 1, and $X^2$ and $X^4$ each comprise a divalent $C_1$ hydrocarbon, the gas barrier additive comprises a compound having the chemical structure:

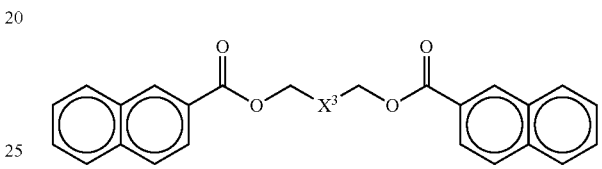

In an embodiment of the compound of Formula I, wherein X and $X^6$ each comprise a naphthyl group, s and v are 0, t and u are 1, each $X^2$ and $X^4$ comprise a divalent $C_1$ hydrocarbon, and $X^3$ comprises a divalent cyclohexane which may be ortho-, meta-, or para-substituted, the gas barrier additive comprises a compound having the chemical structure:

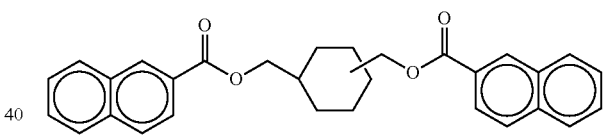

For example, in a particular embodiment wherein the divalent cyclohexane is para-substituted, the gas barrier additive comprises cyclohexane-1,4-diylbis(methylene)di-2-naphthoate, a compound having the chemical structure:

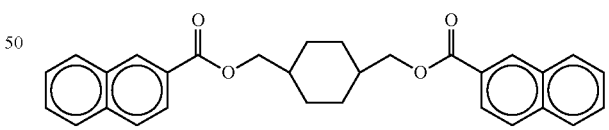

In an embodiment of the compound of Formula II, wherein X and $X^6$ each comprise a cyclohexyl group, the gas barrier additive comprises a compound having the chemical structure:

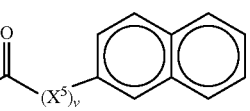

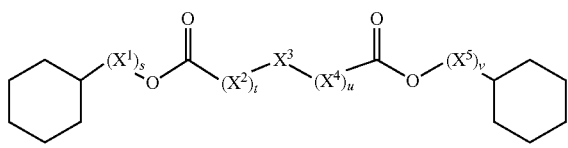

In an embodiment of the compound of Formula II, wherein X and $X^6$ each comprise a cyclohexyl group and s and v are 0, the gas barrier additive comprises a compound having the chemical structure:

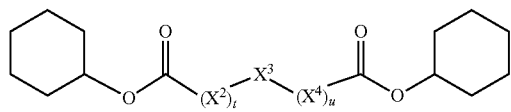

In an embodiment of the compound of Formula II, wherein X and $X^6$ each comprise a cyclohexyl group and s, t, u, and v are 0, the gas barrier additive comprises a compound having the chemical structure:

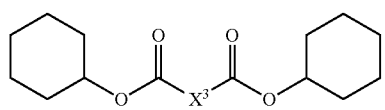

In an embodiment of the compound of Formula II, wherein X and $X^6$ each comprise a cyclohexyl group, s, t, u, and v are 0, and $X^3$ comprises a divalent benzene which may be ortho-, meta-, or para-substituted, the gas barrier additive comprises a compound having the chemical structure:

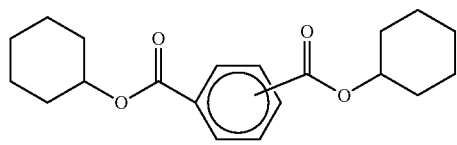

For example, in a particular embodiment wherein the divalent benzene is para-substituted, the gas barrier additive comprises dicyclohexyl terephthalate, a compound having the chemical structure:

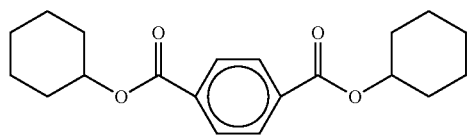

In another embodiment the divalent benzene may be meta-substituted such that the gas barrier additive comprises dicyclohexyl isophthalate, a compound having the chemical structure:

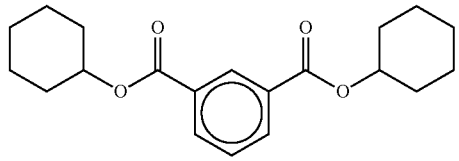

In an embodiment of the compound of Formula II, wherein X and $X^6$ each comprise a cyclohexyl group, s, t, u, and v are 0, and $X^3$ comprises a divalent naphthalene which may be substituted at any position on either ring (e.g., 1, 2, 3, 4, 5, 6, 7, or 8), the gas barrier additive comprises a compound having the chemical structure:

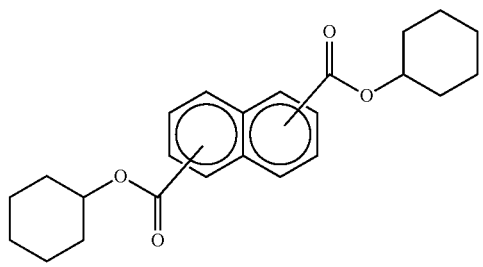

For example, in a particular embodiment wherein the divalent naphthalene is substituted at the 2 and 6 positions, the gas barrier additive comprises dicyclohexyl naphthalene-2,6-dicarboxylate, a compound having the chemical structure:

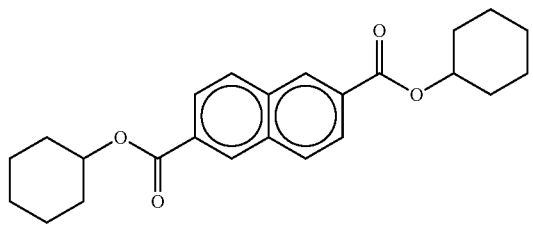

In an embodiment of the compound of Formula II, wherein X and $X^6$ each comprise a benzoate group, the gas barrier additive comprises a compound having the chemical structure:

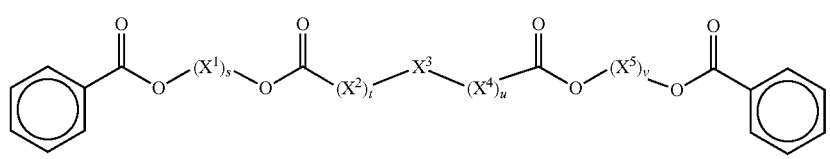

In an embodiment of the compound of Formula II, wherein X and $X^6$ each comprise a benzoate group and t and u are 0, the gas barrier additive comprises a compound having the chemical structure:

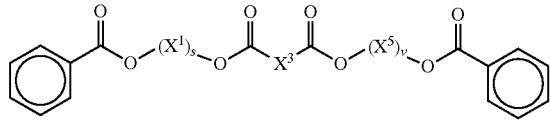

In an embodiment of the compound of Formula II, wherein X and $X^6$ each comprise a benzoate group, t and u are 0, s and v are 1, and $X^1$ and $X^5$ each comprise a divalent $C_1$ hydrocarbon, the gas barrier additive comprises a compound having the chemical structure:

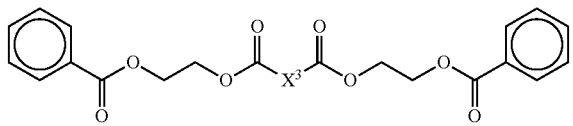

In an embodiment of the compound of Formula II, wherein X and $X^6$ each comprise a benzoate group, t and u are 0, s and v are 1, and $X^1$ and $X^5$ each comprise a divalent $C_1$ hydrocarbon, and $X^3$ is a divalent benzene which may be ortho-, meta-, or para-substituted, the gas barrier additive comprises a compound having the chemical structure:

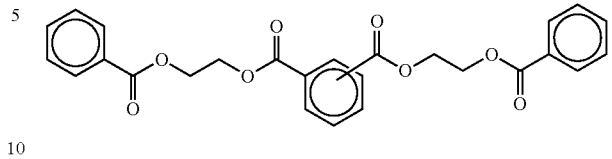

In a particular embodiment wherein the divalent benzene is para-substituted, the gas barrier additive comprises bis(2-(benzoyloxy)ethyl)terephthalate), a compound having the chemical structure:

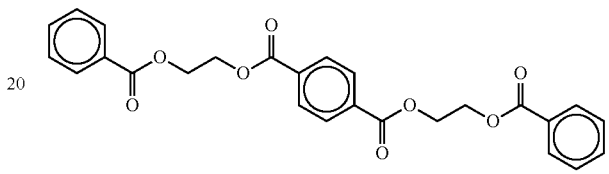

In an embodiment of the compound of Formula II, wherein X and $X^6$ each comprise a benzoate group, the gas barrier additive comprises a compound having the chemical structure:

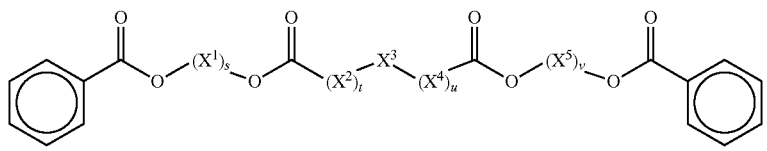

In an embodiment of the compound of Formula II, wherein X and $X^6$ each comprise a benzoate group, s and v are 2, and $X^1$ and $X^5$ each comprise a divalent $C_1$ hydrocarbon, the gas barrier additive comprises a compound having the chemical structure:

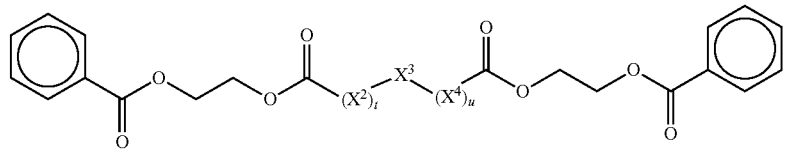

In an embodiment of the compound of Formula II, wherein X and $X^6$ each comprise a benzoate group, s and v are 2, $X^1$ and $X^5$ each comprise a divalent $C_1$ hydrocarbon, t and u are 1, and $X^2$ and $X^4$ each comprise a divalent benzoate which may be ortho-, meta-, or para-substituted, the gas barrier additive comprises a compound having the chemical structure:

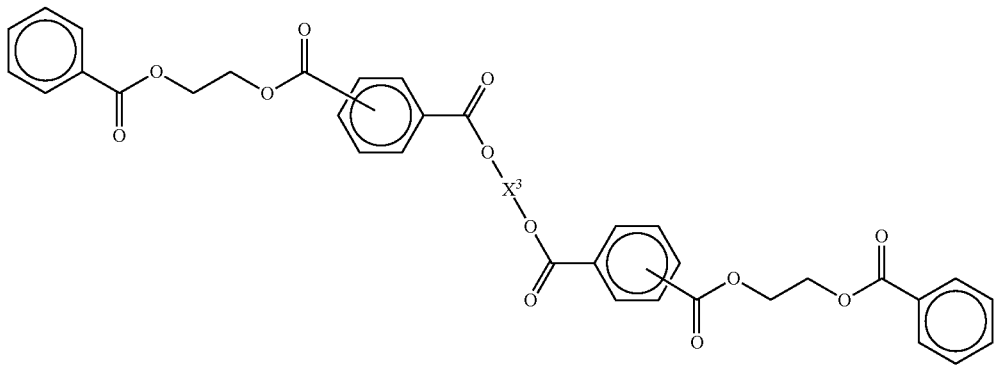

In an embodiment of the compound of Formula II, wherein X and $X^6$ each comprise a benzoate group, s and v are 2, $X^1$ and $X^5$ each comprise a divalent $C_1$ hydrocarbon, t and u are 1, $X^2$ and $X^4$ each comprise a divalent benzoate which may be ortho-, meta-, or para-substituted, and $X^3$ comprises a divalent $C_2$ hydrocarbon, the gas barrier additive comprises a compound having the chemical structure:

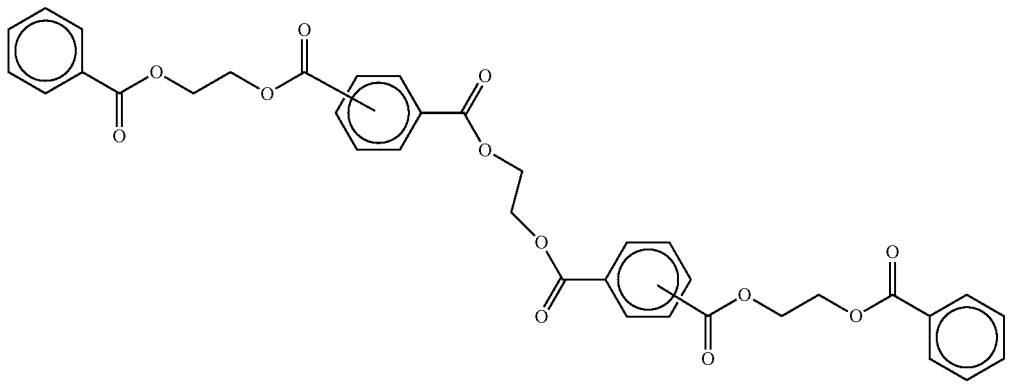

In a particular embodiment wherein the divalent benzoates are meta-substituted, the gas barrier additive comprises bis (2-(benzoyloxy)ethyl)'-ethane-1,2-diyl diisophthalate, a compound having the chemical structure:

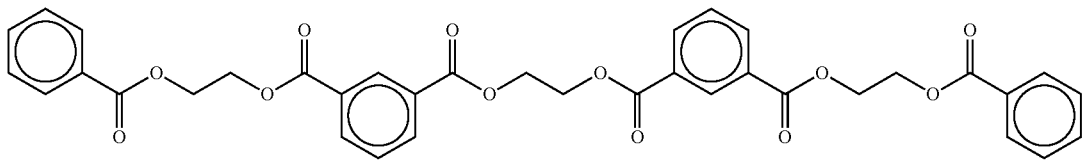

In an embodiment of the compound of Formula II, wherein X and $X^6$ each comprise an aryloxy group (e.g., a phenoxy group), the gas barrier additive comprises a compound having the chemical structure:

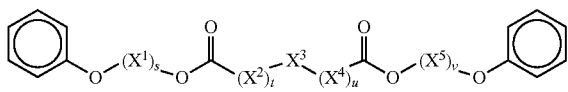

In an embodiment of the compound of Formula II, wherein X and $X^6$ each comprise an aryloxy group (e.g., a phenoxy group), t and u are 0, the gas barrier additive comprises a compound having the chemical structure:

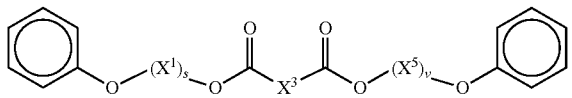

In an embodiment of the compound of Formula II, wherein X and $X^6$ each comprise an aryloxy group (e.g., a phenoxy group), t and u are 0, and $X^3$ comprises a divalent benzene which may be ortho-, meta-, or para-substituted, the gas barrier additive comprises a compound having the chemical structure:

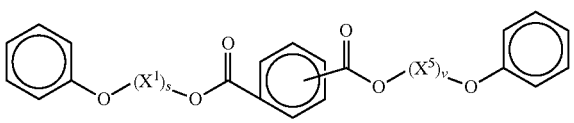

In an embodiment of the compound of Formula II, wherein X and $X^6$ each comprise an aryloxy group (e.g., a phenoxy group), t and u are 0, s and v are 1, $X^1$ and $X^5$ comprise a straight-chain divalent $C_2$ hydrocarbon, and $X^3$ comprises a divalent benzene which may be ortho-, meta-, or para-substituted, the gas barrier additive comprises a compound having the chemical structure:

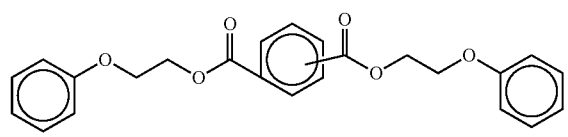

For example, in a particular embodiment wherein the divalent benzene is para-substituted, the gas barrier additive comprises bis(2-phenoxyethyl)terephthalate (PEM), a compound having the chemical structure:

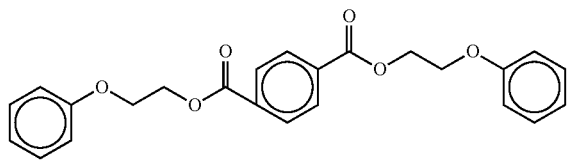

As used herein, the term "heteroatom" refers to any atom other than carbon or hydrogen. Typically, the heteroatom comprises nitrogen, oxygen, or sulfur.

The term "hydrocarbyl," as used herein, is used to describe a monovalent hydrocarbon that may form one bond with another atom within a single chemical compound. The term "divalent hydrocarbon," as used herein, is used to describe a hydrocarbon which may form two bonds to either one other atom as a double bond or two other atoms as separate single bonds, all within a single chemical compound. The term "triavalent hydrocarbon," as used herein, is used to describe a hydrocarbon which may form three bonds to either one atom as a triple bond, two other atoms as a double and single bond, or three atoms as separate single bonds, all within a single chemical compound. A "tetravalent carbon atom," as used herein, is used to describe a carbon atom that may form four bonds to either two other atoms as one triple bond and one single bond, two other atoms as two double bonds, three different atoms as one double bond and two single bonds, or four different atoms as four separate single bonds, all within a single chemical compound.

The terms "hydrocarbon" and "hydrocarbyl," as used herein, include an aliphatic group, an aromatic or aryl group, a cyclic group, a heterocyclic group, or any combination thereof and any substituted derivative thereof, including but not limited to, a halide, an alkoxide, or an amide-substituted derivative thereof. Also included in the definition of the hydrocarbyl are any unsubstituted, branched, or linear analogs thereof. The hydrocaryl may be substituted with one or more functional moieties as described hereinbelow.

Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, and decyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl.

Examples of aryl or aromatic moieties include, but are not limited to, anthracenyl, azulenyl, biphenyl, fluorenyl, indan, indenyl, naphthyl, phenyl, 1,2,3,4-tetrahydro-naphthalene, and the like, including substituted derivatives thereof, in each instance having from 6 to about 10 carbons. Substituted derivatives of aromatic compounds include, but are not limited to, tolyl, xylyl, mesityl, and the like, including any heteroatom substituted derivative thereof. Examples of cyclic groups, in each instance, include, but are not limited to, cycloparaffins, cycloolefins, cycloacetylenes, arenes such as phenyl, bicyclic groups and the like, including substituted derivatives thereof. Thus heteroatom-substituted cyclic groups and bicyclic groups such as furanyl and isosorbyl are also included herein.

In each instance, aliphatic and cyclic groups are groups comprising an aliphatic portion and a cyclic portion, examples of which include, but are not limited to, groups such as: —$(CH_2)_m C_6 H_q M_{5-q}$ wherein m is an integer from 1 to about 10, q is an integer from 1 to 5, inclusive; $(CH_2)_m C_6 H_g R_{10-q}$ wherein m is an integer from 1 to about 10, q is an integer from 1 to 10, inclusive; and $(CH_2)_m C_5 H_q R_{9-q}$ wherein m is an integer from 1 to about 10, q is an integer from 1 to 9, inclusive. In each instance and as defined above, M is independently selected from: an aliphatic group; an aromatic group; a cyclic group; any combination thereof; any substituted derivative thereof, including but not limited to, a halide-, an alkoxide-, or an amide-substituted derivative thereof any one of which has from 1 to about 10 carbon atoms; or hydrogen. In one aspect, aliphatic and cyclic groups include, but are not limited to: —$CH_2C_6H_5$; —$CH_2C_6H_4F$; —$CH_2C_6H_4Cl$; —$CH_2C_6H_4Br$; —$CH_2C_6H_4I$; —$CH_2C_6H_4OMe$; —$CH_2C_6H_4OEt$; —$CH_2C_6H_4NH_2$; —$CH_2C_6H_4NMe_2$; —$CH_2C_6H_4NEt_2$; —$CH_2CH_2C_6H_5$; —$CH_2CH_2C_6H_4F$; —$CH_2CH_2C_6H_4Cl$; —$CH_2CH_2C_6H_4Br$; —$CH_2CH_2C_6H_4I$; —$CH_2CH_2C_6H_4OMe$; —$CH_2CH_2C_6H_4OEt$; —$CH_2CH_2C_6H_4NH_2$; —$CH_2CH_2C_6H_4NMe_2$; —$CH_2CH_2C_6H_4NEt_2$; any regioisomer thereof, or any substituted derivative thereof.

In each instance, the heterocycle comprising at least one N—, O—, or S-heteroatom may be selected from the group consisting of: morpholinyl, thiomorpholinyl, thiomorpholinyl S-oxide, thiomorpholinyl S,S-dioxide, piperazinyl, homopiperazinyl, pyrrolidinyl, pyrrolinyl, tetrahydropyranyl, piperidinyl, tetrahydrofuranyl, tetrahydrothienyl, homopiperidinyl, homomorpholinyl, homothiomorpholinyl, homothiomorpholinyl S,S-dioxide, oxazolidinonyl, dihydropyrazolyl, dihydropyrrolyl, dihydropyrazinyl, dihydropyridinyl, dihydropyrimidinyl, dihydrofuryl, dihydropyranyl, tetrahydrothienyl S-oxide, tetrahydrothienyl S,S-dioxide, and homothiomorpholinyl S-oxide, pyridinyl, pyrimidinyl, quinolinyl, benzothienyl, indolyl, indolinyl, pryidazinyl, pyrazinyl, isoindolyl, isoquinolyl, quinazolinyl, quinoxalinyl, phthalazinyl, imidazolyl, isoxazolyl, pyrazolyl, oxazolyl, thiazolyl, indolizinyl, indazolyl, benzothiazolyl, benzimidazolyl, benzofuranyl, furanyl, thienyl, pyrrolyl, oxadiazolyl, thiadiazolyl, triazolyl, tetrazolyl, oxazolopyridinyl, imidazopyridinyl, isothiazolyl, naphthyridinyl, cinnolinyl, carbazolyl, beta-carbolinyl, isochromanyl, chromanyl, tetrahydroisoquinolinyl, isoindolinyl, isobenzotetrahydrofuranyl, isobenzotetrahydrothienyl, isobenzothienyl, isosorbyl, benzoxazolyl, pyridopyridinyl, benzotetrahydrofuranyl, benzotetrahydrothienyl, purinyl, benzodioxolyl, triazinyl, phenoxazinyl, phenothiazinyl, pteridinyl, benzothiazolyl, imidazopyridinyl, imidazothiazolyl, dihydrobenzisoxazinyl, benzisoxazinyl, benzoxazinyl, dihydrobenzisothiazinyl, benzopyranyl, benzothiopyranyl, coumarinyl, isocoumarinyl, chromonyl, chromanonyl, pyridinyl-N-oxide, tetrahydroquinolinyl, dihydroquinolinyl, dihydroquinolinonyl, dihydroisoquinolinonyl, dihydrocoumarinyl, dihydroisocoumarinyl, isoindolinonyl, benzodioxanyl, benzoxazolinonyl, pyrrolyl N-oxide, pyrimidinyl N-oxide, pyridazinyl N-oxide, pyrazinyl N-oxide, quinolinyl N-oxide, indolyl N-oxide, indolinyl N-oxide, isoquinolyl N-oxide, quinazolinyl N-oxide, quinoxalinyl N-oxide, phthalazinyl N-oxide, imidazolyl N-oxide, isoxazolyl N-oxide, oxazolyl N-oxide, thiazolyl N-oxide, indolizinyl N-oxide, indazolyl N-oxide, benzothiazolyl N-oxide, benzimidazolyl N-oxide, pyrrolyl N-oxide, oxadiazolyl N-oxide, thiadiazolyl N-oxide, triazolyl N-oxide, tetrazolyl N-oxide, benzothiopyranyl S-oxide, or benzothiopyranyl S,S-dioxide.

The term alkoxy, as used herein, and unless otherwise specified, refers to a moiety of the structure —O-alkyl, wherein alkyl is as defined above.

The term acyl, as used herein, refers to a group of the formula C(O)R', wherein R' is an alkyl, aryl, heteroaryl, heterocyclic, alkaryl or aralkyl group, or substituted alkyl, aryl, heteroaryl, heterocyclic, aralkyl or alkaryl, wherein these groups are as defined above.

Unless otherwise indicated, the term "substituted," when used to describe a chemical structure or moiety, refers to a derivative of that structure or moiety wherein one or more of its hydrogen atoms is substituted with a chemical moiety or functional group. Non-limiting examples of suitable functional moieties, as used herein, include halide, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, ether, ketone, ester, and any other viable functional group.

III. Creep Control Agents

In one aspect of this disclosure, the polyester composition comprises a creep control agent having the chemical structure of Formula I:

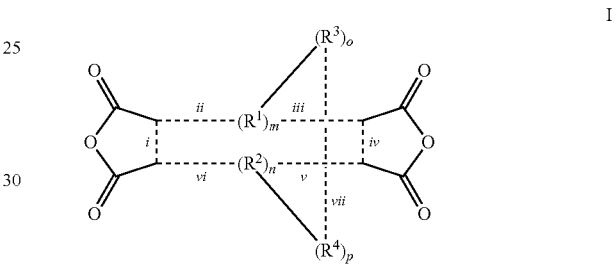

wherein $R^1$, $R^2$, $R^3$, and $R^4$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, and vi, independent of one another, comprise a single, double, or triple bond; wherein when i is a double bond, ii and vi are single bonds; wherein when ii is a double bond, i and iii are single bonds; wherein when iii is a double bond, ii and iv are single bonds; wherein when iv is a double bond iii and v are single bonds; wherein when v is a double bond, iv and vi are single bonds; wherein when vi is a double bond, i and v are single bonds; wherein vii may be a single bond, double bond, or no bond at all connects $R^3$ and $R^4$;

wherein m, n, o, and p, independent of one another, may be 0 or 1; wherein when m is 0, bonds ii and iii form a single continuous bond; wherein when n is 0, bonds vi and v form a single continuous bond; wherein when o is 0, $R^4$ is bonded to $R^1$ by a single bond; and wherein when p is 0, $R^3$ is bonded to $R^2$ by a single bond.

In a particular embodiment of the compound of Formula I, wherein m, n, o, and p are 0; and i, ii/iii, iv, and v/vi are single bonds; the creep control agent comprises cyclobutane-1,2,3,4-tetracarboxylic acid dianhydride, a compound having the chemical structure:

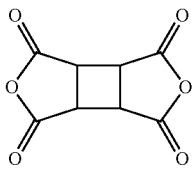 [SMILES: O=C1OC(=O)C2C1C1C(=O)OC(=O)C21]

In another embodiment of the compound of Formula I, wherein n, o, and p are 0; m is 1; i, ii, iii, iv, and v/vi are single bonds; and $R^1$ is oxygen; the creep control agent comprises 2,3,4,5-tetrahydro-2,3,4,5-tetracarboxylic-furan dianhydride, a compound having the chemical structure:

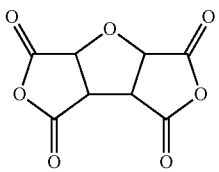 [SMILES: O=C1OC(=O)C2C1OC1C(=O)OC(=O)C12]

In yet another embodiment of the compound of Formula I, wherein m and n are 1; o and p are 0; $R^1$ and $R^2$ are trivalent hydrocarbons comprising 1 carbon atom; i, iii, and v are double bonds; and ii, iv, and vi are single bonds; the creep control agent comprises pyromellitic dianhydride, a compound having the chemical structure:

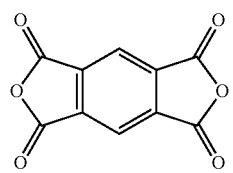 [SMILES: O=c1oc(=O)c2cc3c(=O)oc(=O)c3cc12]

In yet another embodiment of the compound of Formula I, wherein m, n, o, and p are 1; $R^1$, $R^2$, $R^3$, and $R^4$ are trivalent hydrocarbons comprising 1 carbon atom; i, ii, iii, iv, v, and vi are single bonds; and vii is a double bond; the creep control agent comprises bicyclo [2.2.2]oct-3,4-ene-1,2,5,6-tetracarboxylic acid dianhydride, a compound having the chemical structure:

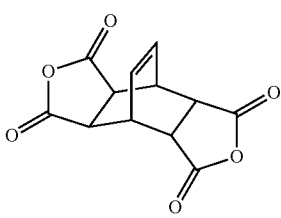 [SMILES: O=C1OC(=O)C2C3C=CC(C12)C1C(=O)OC(=O)C31]

In another aspect of this disclosure, the polyester composition comprises a creep control agent having the chemical structure of Formula II:

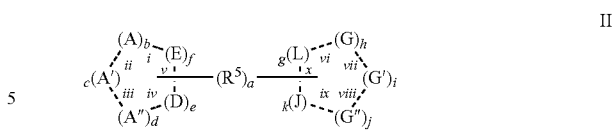

wherein A, A', A", E, D, G, G', G", L, and J, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, vi, vii, viii, ix, and x, independent of one another, may comprise a single or double bond; wherein when i is a double bond, ii and v are single bonds; wherein when ii is a double bond, i and iii are single bonds; wherein when iii is a double bond, ii and iv are single bonds; wherein when iv is a double bond, iii and v are single bonds; wherein when v is a double bond, i and iv are single bonds; wherein when vi is a double bond, vii and x are single bonds; wherein when vii is a double bond, vi and viii are single bonds; wherein when viii is a double bond, vii and ix are single bonds; wherein when ix is a double bond, viii and x are single bonds; wherein when x is a double bond, vi and ix are single bonds;

wherein b, c, d, e, f, g, h, i, j, and k, independent of one another may be 0 or 1;

wherein a may be 0 or 1; and wherein $R^5$ may be a heteroatom or a $C_1$-$C_{10}$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties.

In one embodiment of the compound of Formula II, wherein b, c, d, e, f, g, h, i, j, and k, are 1; a is 0; E and L are divalent hydrocarbons comprising 1 carbon atom; A', D, J, G' are trivalent hydrocarbons comprising 1 carbon atom; A and G" are oxygen; A" and G are nitrogen; i, ii, iv, v, vi, viii, ix, and x are single bonds; iii and vii are double bonds; and the ring comprising A, A', A", D, and E is bonded to the ring comprising G, G', G", L, and J via a single bond between D and J, the creep control agent is 4,'-bisoxazoline, a compound having the chemical structure:

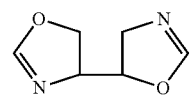

In another embodiment of the compound of Formula II, wherein b, c, d, e, f, g, h, i, j, and k are 1; a is 0; A', D, J, G' are trivalent hydrocarbons comprising 1 carbon atom; E and L are divalent hydrocarbons comprising 1 carbon atom; A and G are nitrogen; A" and G" are oxygen; ii and vii are double bonds; i, iii, iv, v, vi, viii, ix, and x are single bonds; and the ring comprising A, A', A", D, and E is bonded to the ring comprising G, G', G", L, and J via a single bond between D and J, the creep control agent is 4,4'-bisoxazoline, a compound having the chemical structure:

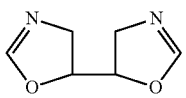

In yet another embodiment of the compound of Formula II, wherein b, c, d, e, f, g, h, i, j, and k are 1; a is 0; A" and G" are oxygen; E and L are nitrogen; J and D are tetravalent carbon atoms; A, A', G and G' are divalent hydrocarbons comprising 1 carbon atom; v and x are double bonds; i, ii, iii, iv, vi, vii, viii, and ix are single bonds; and the ring comprising A, A', A", D, and E is bonded to the ring comprising G, G', G", L, and J, via a single bond between D and J, the creep control agent is 2,2'-bix(2-oxazoline), a compound having the chemical structure:

In yet another embodiment of the compound of Formula II, wherein a, b, c, d, e, f, g, h, i, j, and k are 1; A', D, J, G' are trivalent hydrocarbons comprising 1 carbon atom; $R^5$, E and L are divalent hydrocarbons comprising 1 carbon atom; A and G are nitrogen; A" and G" are oxygen; ii and vii are double bonds; i, iii, iv, v, vi, viii, ix, and x are single bonds; and $R^5$ is bonded to D and J, the creep control agent is bis(4,5-dihydrooxazol-5-yl)methane, a compound having the chemical structure:

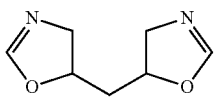 [SMILES: C1=NCC(CC2CN=CO2)O1]

In yet another embodiment of the compound of Formula II, wherein d, e, f, g, k, j, and a are 1; b, c, h, and i are 0; E and L are oxygen; $R^5$, A", and G" are divalent hydrocarbons comprising 1 carbon atom; D, and J are trivalent hydrocarbons comprising carbon atom; iv, v, ix, and x are single bonds; E and A" are bonded directly together via a single bond; L and G" are bonded together via a single bond; and $R^5$ is bonded to D and J, the creep control agent is bis(4,5-dihydrooxaol-5-yl)methane, a compound having the chemical structure:

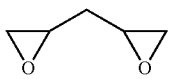

In another aspect of this disclosure, the polyester composition comprises a creep control agent having the chemical structure of Formula III:

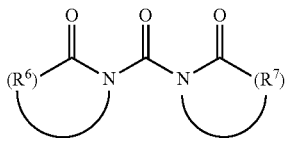

III wherein $R^6$ and $R^7$, independent of one another, may comprise a $C_1$-$C_5$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties.

In one particular embodiment of the compound of Formula III, wherein $R^6$ and $R^7$ are divalent hydrocarbons comprising 5 carbon atoms, the creep control agent is bis-carpolactam carbonyl, a compound having the chemical structure:

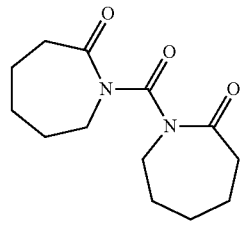 [SMILES: O=C1CCCCCN1C(=O)N1CCCCCC1=O]

In yet another aspect of this disclosure, the polyester composition comprises a creep control agent having the chemical structure of Formula IV:

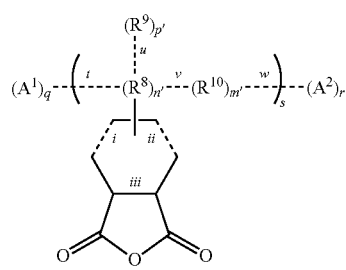

IV wherein $A^1$, $A^2$, $R^8$, $R^9$, and $R^{10}$, independent of one another, may comprise a heteroatom, a tetravalent carbon atom, a $C_1$-$C_{10}$ divalent or trivalent hydrocarbon, or a $C_1$-$C_{10}$ hydrocarbyl that may be unsubstituted or substituted with one or more functional moieties;

wherein each heteroatom, tetravalent carbon atom, or $C_1$-$C_{10}$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein m', n', and p', independent of one another, may be 0 or 1;

wherein i, ii, and iii, independent of one another may be a single bond or a double bond;

wherein t, u, v, and w, independent of one another may be a single bond, double bond, or triple bond; and wherein q, r, and s may be from 0 to 10,000.

In one particular embodiment of the compound of Formula IV, wherein q, r, p', m' are 0; s and n' are 1; $R^8$ is isobenzofuran-1,3-dione; i, ii, and iii are double bonds; the creep control agent is biphenyl-2,3,2',3'-tetracarboxylic acid dianhydride, a compound with the chemical structure:

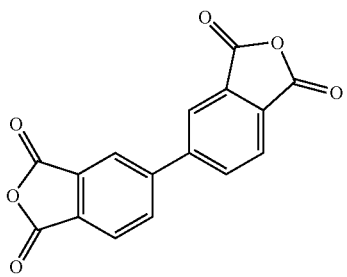 [SMILES: O=C1OC(=O)c2cc(-c3ccc4c(c3)C(=O)OC4=O)ccc21]

In another particular embodiment of the compound of Formula IV, wherein q, and r are 0; s, p', n', and m' are 1; $R^8$ comprises a tetravalent carbon atom; $R^9$ comprises oxygen; $R^{10}$ comprises isobenzofuran-1,3-dione; u, i, ii, and iii are double bonds; and v is a single bond, the creep control agent is benzophenone-3,4,3',4'-tetracarboxylic acid dianhydride, a compound with the chemical formula:

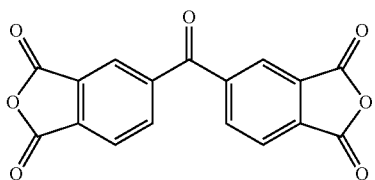 [SMILES: O=C(c1ccc2c(c1)C(=O)OC2=O)c1ccc2c(c1)C(=O)OC2=O]

In another particular embodiment of the compound of Formula IV, wherein q and s are 1000; r and p' are 0; m' and n' are 1; $R^8$ is a trivalent hydrocarbon comprising 1 carbon atom; $R^{10}$ is a divalent hydrocarbon comprising 1 carbon atom; t and v are single bonds; i, ii, and iii are double bonds; and $A^1$ is a methyl methacrylate monomer, the creep control agent is a co-polymer of 5-vinylisobenzofuran-1,3-dione and methyl methacrylate (MMA), a co-polymer with the chemical formula:

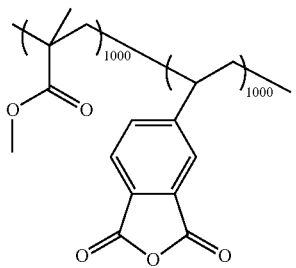

In another particular embodiment of the compound of Formula IV, wherein q and s are 1000; r and p' are 0; m' and n' are 1; $R^8$ is a trivalent hydrocarbon comprising 1 carbon atom; $R^{10}$ is a divalent hydrocarbon comprising one carbon atom; t and v are single bonds; i, ii, and iii are double bonds; and $A^1$ is a styrene monomer, the creep control agent is a co-polymer of 5-vinylisobenzofuran-1,3-dione and styrene, a co-polymer with the chemical formula:

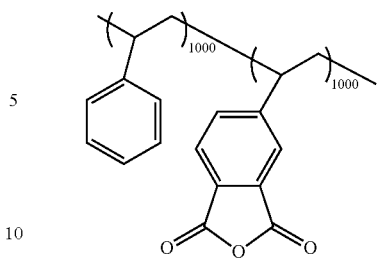

In yet another particular embodiment of the compound of Formula IV, wherein r, q, and s are 1000; p' is 0; m' and n' are 1; $R^8$ is a trivalent hydrocarbon comprising 1 carbon atom; $R^{10}$ is a divalent hydrocarbon comprising one carbon atom; w, t, and v are single bonds; i, ii, and iii are double bonds; $A^1$ is a methyl methacrylate monomer; and $A^2$ is a styrene monomer, the creep control agent is a co-polymer of methyl methacrylate, 5-vinylisobenzofuran-1,3-dione, and styrene, a co-polymer with the chemical formula:

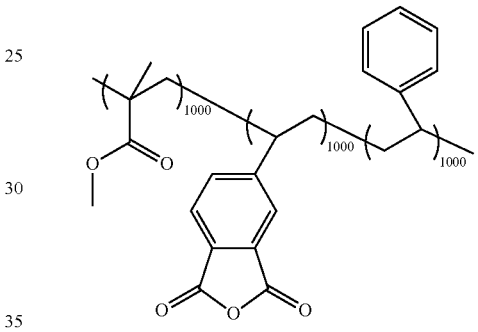

In another aspect of this disclosure, the polyester composition comprises a creep control agent having the chemical structure of Formula V:

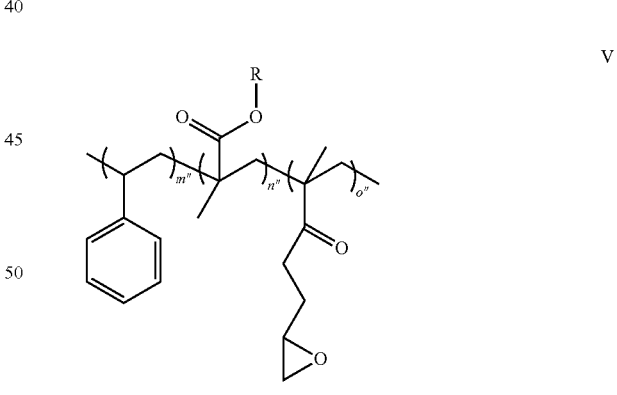

V wherein R may comprise a heteroatom or a $C_1$-$C_{10}$ hydrocarbyl which may be unsubstituted or substituted with one or more functional moieties; and wherein m", n", and o", independent of one another, may be from 0 to 1,000.

Formula V represents the chemical structure of Joncryl®-ADR, which is sold by BASF Corporation, Florham Park, N.J., 07932. The molecular weight of the polymer represented by Formula V is below about 3000.

In a particular embodiment of the compound of Formula V, wherein m", n", and o" are 100; and R is a methyl, the creep control agent is a co-polymer having the chemical structure:

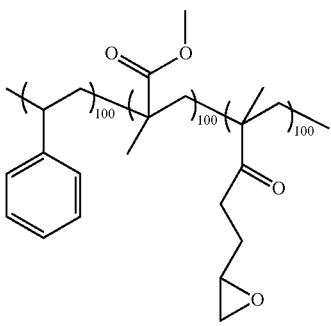

In yet another aspect of this disclosure, the polyester composition comprises a creep control agent having the chemical structure of Formula VI:

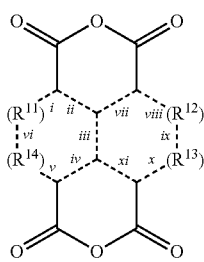

VI wherein $R^{11}$, $R^{12}$, $R^{13}$, and $R^{14}$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, and xi, independent of one another, are a single bond or double bond; wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, and xi are single bonds; wherein when v is a double bond, vi and iv are single bonds; wherein when vi is a double bond, i and v are single bonds; wherein when vii is a double bond, ii, iii, and viii are single bonds; wherein when viii is a double bond, vi and ix are single bonds; wherein when ix is a double bond, viii and x are single bonds; wherein when x is a double bond, ix and xi are single bonds; wherein when xi is a double bond, iv, x, and iii are single bonds.

In a particular embodiment of the compound of Formula VI, wherein $R^{11}$, $R^{12}$, $R^{13}$, and $R^{14}$ are trivalent hydrocarbons comprising one carbon atom; vi, ii, iv, viii, and x are double bonds; and i, iii, v, vii, ix are single bonds, the creep control agent is 1,4,5,8-tetracarboxylic acid-naphthalene dianhydride, a compound having the chemical formula:

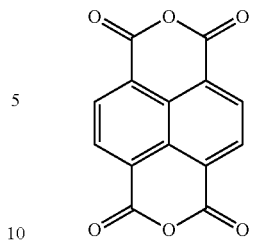

In yet another aspect of this disclosure, the polyester composition comprises a creep control agent having the chemical structure of Formula VII:

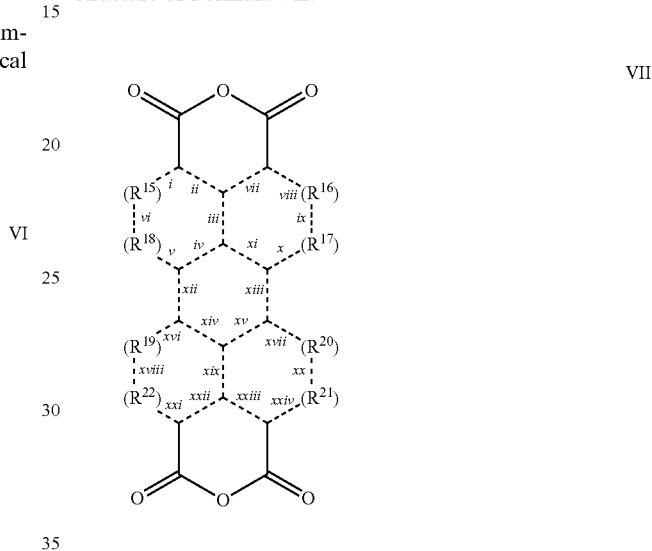

VII wherein $R^{15}$, $R^{16}$, $R^{17}$, $R^{18}$, $R^{19}$, $R^{20}$, $R^{21}$ and $R^{22}$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, xi, xii, xiii, xiv, xv, xvi, xvii, xviii, xix, xx, xxi, xxii, independent of one another, are a double bond or single bond; wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, xi, and xii are single bonds; wherein when v is a double bond, vi, iv, and xii are single bonds; wherein when vi is a double bond, i and v are single bonds; wherein when vii is a double bond, ii, iii and viii are single bonds; wherein when viii is a double bond, vii and ix are single bonds; wherein when ix is a double bond, viii and x are single bonds; wherein when x is a double bond, ix, xi, and xiii are single bonds; wherein when xi is a double bond, iii, iv, xiii and x are single bonds; wherein when xii is a double bond, v, iv, xvi, and xiv are single bonds; wherein when xiv is a double bond, xii, xvi, xv, and xix are single bonds; wherein when xv is a double bond, xiii, xvii, xiv, and xix are single bonds; when xiii is a double bond, xi, x, xv, and xvii are single bonds; when xvi is a double bond, xii, xiv, and xviii are single bonds; wherein when xviii is a double bond, xvi and xxi are single bonds; wherein when xxi is a double bond, xviii and xxii are single bonds; wherein when xxii is a double bond, xxi, xix, and xxiii are single bonds; wherein when xix is a double bond, xiv, xv, xxii, and xxiii are single bonds; wherein when xxiii is a double bond, xix, xxii, and xxiv are single bonds; wherein when xxiv is a double bond, xxiii and xx are single bonds; wherein when xx is a double bond, xvii and xxiv are single bonds; and wherein when xvii is a double bond, xv, xiii and xx are single bonds.

In a particular embodiment of the compound of Formula VI, wherein $R^{15}$, $R^{16}$, $R^{17}$, $R^{18}$, $R^{19}$, $R^{20}$, $R^{21}$, and $R^{22}$ are trivalent hydrocarbons comprising 1 carbon atom; ii, iv, vi, viii, x, xiv, xvii, xviii, xxii, and xxiv are double bonds, and i, iii, v, vii, xi, xii, xiii, ix, xv, xvi, xix, xxi, xxiii, and xx are single bonds; the creep control agent is perylene-3,4,9,10-tetracarboxylic acid dianhydride, a compound having the chemical structure:

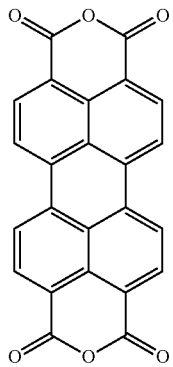 [SMILES: O=C1OC(=O)c2ccc3c4ccc5c6c(ccc(c7ccc1c2c73)c64)C(=O)OC5=O]

IV. Methods of Making Polyester Composition and Containers

As described above, the polyester compositions provided herein are useful for making containers in which enhanced gas barrier properties are desirable. In short, such containers are made by forming the above described polyester compositions into the desired container by conventional methods such as melt forming. Suitable melt forming processes include, but are not limited to, injection molding, extrusion, thermal forming and compression molding of preforms followed by the blow molding of the melt formed preforms into bottles. The particularly preferred method for making the containers of this invention is stretch blow molding.

Methods for incorporating the gas barrier enhancing additive into the container and polyester composition also are provided herein. Such methods also are well known to those skilled in the art. For example, an additive can be fed directly into the polyester during the injection molding process, pre-blended with the polyester resin prior to injection molding, or incorporated at high concentrations with PET as masterbatch and then blended with the polyester resin prior to both injection molding of the preform and stretch blow molding of the container. Those skilled in the art will appreciate that such methods may be modified depending on the form of the additive being used. For example, when using additives in powder form, the polyester resin may be ground to reduce the size of the pellets and facilitate the formation of a homogeneous blend.

FIG. 1 illustrates a system 10 in accordance with an embodiment of this invention for making a rigid container preform 12 (illustrated in FIG. 2) and a rigid container 14 (illustrated in FIG. 3) from the preform. As is shown in FIG. 1, PET 20 and a gas barrier enhancing additive 22 are added to a feeder or hopper 24 that delivers the components to a hot melt extruder 26 in which the components are melted and blended with a polyester. The hot melt extruder 26 then extrudes the molten mixture of the polyester 20 and gas barrier enhancing additive 22 into an injection molding device 28 to form the preform 12. The preform 12 is cooled and removed from the injection molding device 28 and delivered to a stretch blow molding device 30 which stretch blow molds the preform 12 into a finished rigid container 14.

The melt residence time of the preform production is preferably less than five minutes and more preferably from about one to about three minutes. The melt temperatures are desirably from about 260 to about 300° C. and more desirably from about 270 to about 290° C. The melt residence time begins when the PET 20 and gas barrier enhancing additive 22 enter the melt extruder 26 and start melting, and ends after injection of the molten blend into the injection mold to form the preform 12

V. Containers

As is well known to those skilled in the art, containers can be made by blow molding a container preform. Examples of suitable preform and container structures are disclosed in U.S. Pat. No. 5,888,598, the disclosure of which as it relates to the preform and container structures being expressly incorporated herein by reference.

Figures 2, 3, 4:
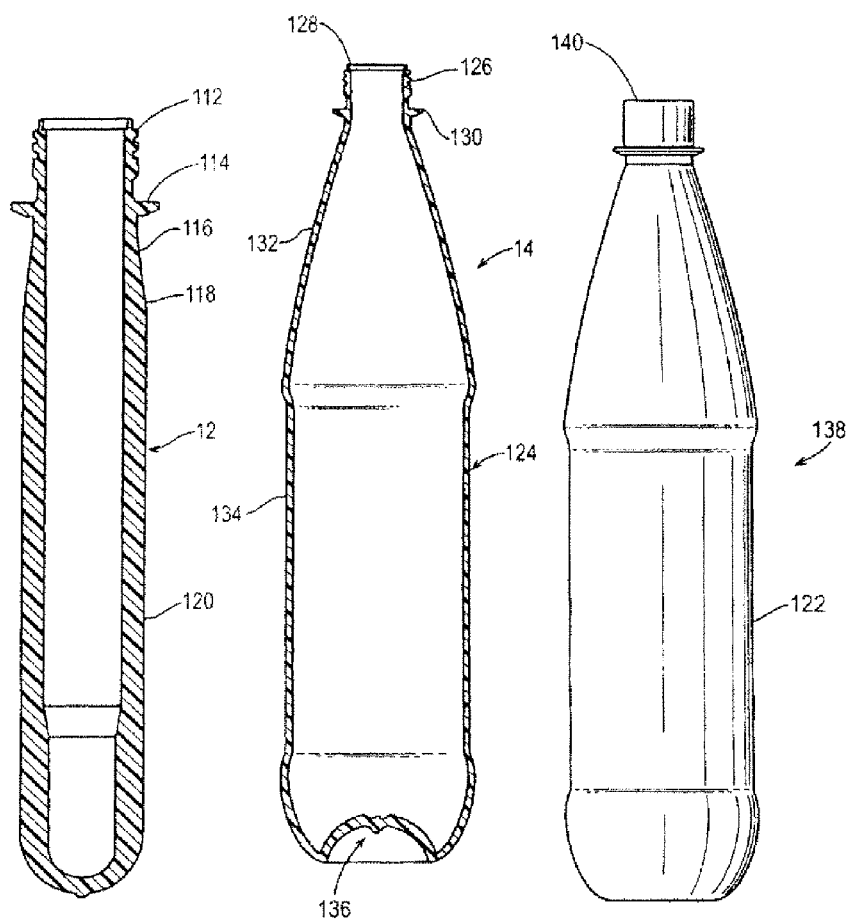
FIG. 2 is a sectional elevation view of a molded container preform made in accordance with an embodiment.
FIG. 3 is a sectional elevation view of a blow molded container made from the preform of FIG. 2 in accordance with an embodiment.
FIG. 4 is a perspective view of a packaged beverage made in accordance with an embodiment.

A polyester container preform 12 is illustrated in FIG. 2. This preform 12 is made by injection molding or compression molding PET based resin and comprises a threaded neck finish 112 which terminates at its lower end in a capping flange 114. Below the capping flange 114, there is a generally cylindrical section 116 which terminates in a section 118 of gradually increasing external diameter so as to provide for an increasing wall thickness. Below the section 118 there is an elongated body section 120.

The preform 12 illustrated in FIG. 2 can be stretch blow molded to form a container 14 illustrated in FIGS. 3 and 4. The container 14 comprises a shell 124 comprising a threaded neck finish 126 defining a mouth 128, a capping flange 130 below the threaded neck finish, a tapered section 132 extending from the capping flange, a body section 134 extending below the tapered section, and a base 136 at the bottom of the container. The container 14 is suitably used to make a packaged beverage 138, as illustrated in FIG. 4. The packaged beverage 138 includes a beverage such as a carbonated soda beverage disposed in the container 14 and a closure 140 sealing the mouth 128 of the container.

The polyester container optionally may comprise a plurality of layers. Those skilled in the art will appreciate that the polyester composition comprising the polyester and gas barrier additive may be disposed in any of the one or more layers of such multilayer containers. For example, the polyester composition comprising the polyester and gas barrier enhancing additive may be disposed between two or more outer layers.

The preform 12, container 14, and packaged beverage 138 are but examples of applications using the preforms of the present disclosure. It should be understood that the process and apparatus provided herein can be used to make preforms and containers having a variety of configurations.

The present disclosure is further illustrated by the following examples, which are not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

EXAMPLES

Example 1

A bis(2-(benzoyloxy)ethyl)terephthalate) (hereinafter "BPO-1") and bis(2-(benzoyloxy)ethyl)'-ethane-1,2-diyl diisophthalate (hereinafter "BPO-2") were prepared by reacting bis(hydroxyethyl)terephthalate (BHET) with benzoic anhydride.

BPO-1 Preparation

Dry toluene (1000 mL) was added to a dry 200 mL three neck round bottom flask fitted with a mechanical stirrer, water cooled condenser capped with a desicant drying tube, and a pressure equalizing addition funnel. BHET (105.40 g, 0.415 moles) was added to the toluene with agitation, followed by triethylamine (126.7 mL, 0.913 mol). The toluene reaction mixture was heated to 50° C. and benzoyl chloride (128.33 g) was added drop wise at a rate sufficient to keep the reaction temperature at 90° C. The reaction mixture was maintained at 90° C. with agitation until the disappearance of the starting material was evident by thin layer chromatography. The reaction mixture was cooled to 40° C. and filtered to remove the precipitated triethylamine hydrochloride. The filtrate was washed with an equal volume of 10% sodium hydroxide solution followed by washing with water until a neutral pH was measured in the wash water. The toluene was dried with a desiccant and the solvent removed by evaporation. The remaining solid was purified by fractional recrystallization from chloroform using methanol.

Not wishing to be bound by any theory, it is believed that the reaction mechanism to produce the BPO-1 proceeds as follows:

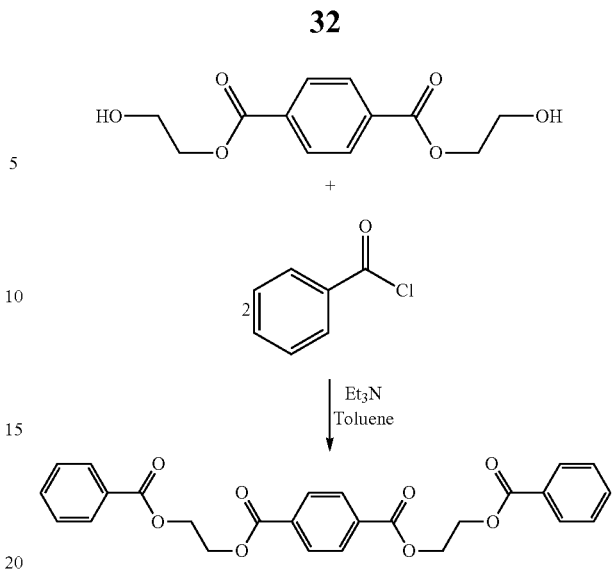

BPO-2 Preparation

The BHET (101.47 g, 0.399 mol) was stirred and heated to 140-160° C. under mild vacuum conditions (20-25 torr) until a rapid release of ethylene glycol was achieved. The resulting PET oligomers were dissolved in p-toluene sulfonic acid (100 mg) and a titanium catalyst Ti(OBu)$_4$ (100 mg in 50 mL toluene, 13 ppm metal equivalent) was added (200 mL total volume added). Benzoic anhydride (76.1 g) was added slowly, resulting in formation of a biphasic system. A Dean-Stark trap was attached and the mixture was refluxed until a sufficient amount of water (~3 mL) was removed. The rate of water removal was significantly faster than for the BPO-1 preparation (in less than 24 hours the water removal was sufficient); however, the reaction was allowed to proceed for 48 hours in order to assure complete reaction. The reaction mixture was then cooled and filtered under vacuum to remove solids. The solids were washed with acetone and then hexanes or ether and dried under vacuum.

Not wishing to be bound by any theory, it is believed that the reaction mechanism to produce the BPO-2 proceeds as follows:

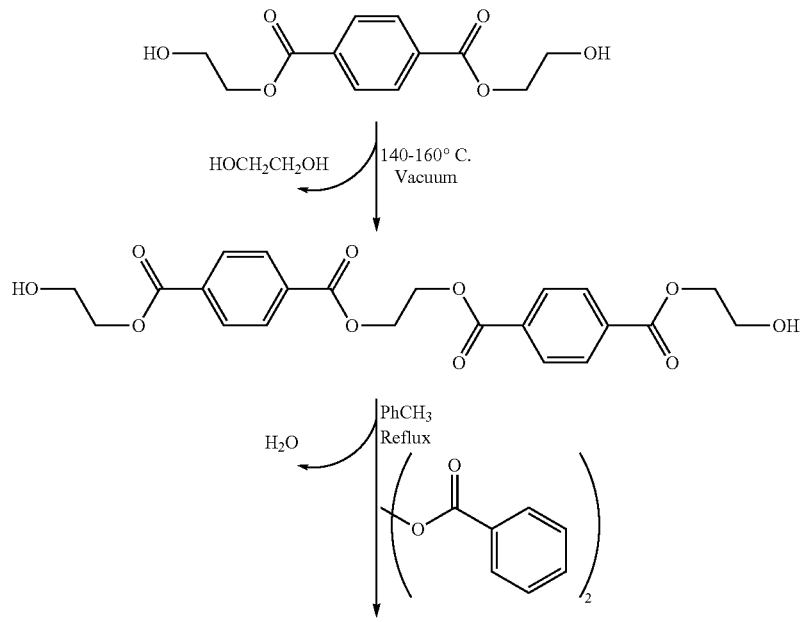

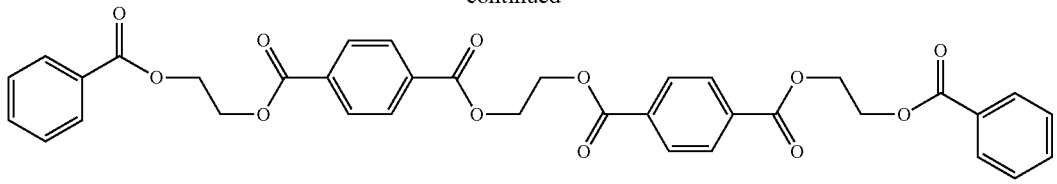
-continued

Analysis of Solids

The solids from both of the foregoing reactions were analyzed using IR to identify the presence of two difference C=O stretches and the presence of hydroxyl end groups. Additional characterization by acid number, hydroxyl end group determination, and GPC also were conducted.

Example 2

The relative volatility of these compounds was compared to previously described low molecular weight gas barrier additives. A known mass of the additive was heated in a 245° C. oven for a brief period of time, cooled, and the remaining mass evaluated. The following table compares the resulting rate of loss of the gas barrier additives.

TABLE 1

Comparison of Additive Volatility

| Additive | Rate of Mass Loss (% per hour) | Relative Rate |
|---|---|---|
| Caffeine | 137 | 1 |
| BPO-2 | 1.02 | 0.00744 |
| BPO-1 | 2.41 | 0.0179 |
|  | 0.11* | 0.000803* |

*This data reflects the plateau region the BPO-1 showed after the initial mass loss.

Although there were several possible sources of error (e.g., from the repeated heating and cooling, from the slow additional polymerization of the samples at these high temperatures after prolonged periods of time, and from the initial rapid mass loss due to the possible presence of retained volatiles from the synthesis and purification of the additive), the data illustrates the significantly reduced rate of volatility as compared to previously described low molecular weight additives. This reduced volatility indicates that the proposed gas barrier additives should pose no significant risk of plate-out or tool fouling during the injection molding process.

Example 3

Additional experiments were conducted to evaluate potential synthetic routes for the commercial production of BPO-1. Methods for commercial production of BPO-1 may desirably eliminate or significantly reduce the solvent usage while maximizing product yield and quality.

A. BPO-1 Preparation from BHET and Methyl Benzoate

One method for preparing BPO-1 involved the direct esterification of BHET (12.70 g, 0.0499 mol) with methyl benzoate (14.96 g, 0.110 mol) using the catalyst TYZOR® TNBT (E. I. du Pont de Nemours and Company, Delaware, United States) (0.3 g, 8.82*10$^{-4}$ mol) and heated to 120° C. The melt temperature was then increased to 170° C. and the reaction was allowed to proceed for 6 hours. The methanol produced in the reaction was distilled off and a white precipitate was separated via filtration and analyzed using thin-layer chromatography (TLC). The TLC analysis showed the formation of BPO-1 (16.32 g, 70% conversion) in the presence of a monoester and unreacted BHET.

Those of skill in the art should appreciate that other catalysts also may be used in the esterification of BHET. For example, zirconium, hafnium, titanium catalysts (other than the one above), or the like, may be employed as the catalyst in this process. Zirconium and hafnium catalysts that may be used include $ZrOCl_2*H_2O$ and $HfCl_4*2THF$, respectively. The optimum reaction conditions for the esterification may vary depending on the catalyst used (e.g., mole ratios, catalyst levels, reaction times, and temperatures may be adjusted as needed). It should also be noted that the term "esterification," as used herein, refers to both esterifications and processes commonly referred to as "trans-esterifications."

In addition, other alkyl benzoates, including straight or branched alkyl benzoates, may also be used in the esterification. Benzoic acid may also be used instead of an alkyl benzoate. Not wishing to be bound by any theory, it is believed that the esterification reaction produces water when benzoic acid is used instead of an alkyl benzoate. The water produced by the reaction of benzoic acid may limit the effectiveness of the catalysts. The esterification may also be run in the presence of a suitable organic solvent. Non-limiting examples of suitable organic solvents include benzene, toluene, or xylene.

B. BPO-1 Preparation from BHET and Methyl Benzoate and Recovery Via Vacuum Distillation Another method for preparing BPO-1 involved the reaction of BHET (150.02 g, 0.59 mol) with methyl benzoate (321.31 g, 2.36 mol) using the catalyst TYZOR® TPT (E. I. du Pont de Nemours and Company, Delaware, United States) (0.24 g, 8.44*10$^{-4}$ mol). The reaction vessel was purged using nitrogen and the mixture was gradually heated to 210° C. The reaction proceeded until methanol evolution ceased (approximately 5 hours from the start of heatup to completion or approximately 3 hours, 50 minutes from the start of methanol evolution). The crude reaction product was transferred into another container and became a thick paste of white precipitate in the excess methyl benzoate upon cooling. Analysis of the crude reaction product dissolved in chloroform and spotted on a TLC plate (stationary phase: neutral alumina) using a mobile phase of chloroform showed complete conversion of the BHET starting material to predominately BPO-1 ($R_f$~0.84) with small amounts of oligomeric material (dimer–$R_f$~0.75; trimer–$R_f$~0.61). The excess methyl benzoate starting material appeared at $R_f$~0.92.

The BPO-1 was isolated from the crude reaction mixture by vacuum distillation to remove the excess methyl benzoate. A vacuum of ~250 mm Hg was used and the vessel temperature was kept below 180° C. to minimize the risk of distilling the BPO-1 product. Those skilled in the art will appreciate that the temperatures and strength of the vacuum may be adjusted by a person of skill to obtain similar results (e.g., a higher vacuum may require a temperature well below 180° C.). After removal of the excess methyl benzoate, the product was cooled and solidified below 105° C. to give a faint yellow-white solid. Analysis of the product by TLC indicated that the product was predominately BPO-1 with small amounts of oligomeric material present.

This reaction and separation was repeated while modifying several variables (e.g., temperature, catalyst weight percentage, catalyst, and molar ratio of methyl benzoate to BHET). Each reaction was conducted using 150 g (0.59 mol) of BHET. The weight percentages of the catalysts in the table are based on the total weight of the reactants. The reaction conversion is based on the amount of evolved methanol relative to the theoretical stoichiometric yield (37.81 g) of methanol from 150 g of BHET. The following table depicts the percent yield of methanol, the degree of yellow color produced, and the presence of other oligomers in each reaction.

TABLE 2

Comparison of BPO-1 Reaction Conditions

| Mole Ratio | Temp (° C.) | Wt % Cat. | Catalyst Type* | % Yield MeOH | Yellow Color** | Oligomer Present |
|---|---|---|---|---|---|---|
| 2.25 | 195 | 0.5 | TPT | 50.2 | -- | Yes |
| 2.25 | 195 | 0.1 | TPT | 46.0 | ++ | Yes |
| 2.05 | 195 | 0.5 | TPT | 56.5 | -- | Yes |
| 2.05 | 195 | 0.1 | TPT | 34.9 | ++ | Yes |
| 2.15 | 195 | 0.3 | TPT | 50.2 | - | Yes |
| 2.05 | 215 | 0.5 | TPT | 52.9 | -- | Yes |
| 2.05 | 205 | 0.3 | TPT | 45.4 | - | Yes |
| 2.05 | 265 | 1.3 | TPT | 81.2 | ---- | yes, very high |
| 2.05 | 260 | 0.1 | TPT | 73.2 | ++ | yes, very high |
| 4.00 | 210 | 1.0 | TPT | 90.0 | --- | low, minor |
| 2.50 | 210 | 1.0 | TnBT | 69.0 | --- | Yes |
| 3.00 | 210 | 1.0 | TPT | 81.2 | --- | Yes |
| 4.00 | 210 | 0.3 | TPT | 100.0 | - | low, minor |
| 4.00 | 210 | 0.1 | TPT | 100.0 | ++ | low, minor |
| 4.00 | 210 | 0.05 | TPT | 100.0 | ++++ | low, minor |

*TPT (tetra-isopropyl titanate), TnBT (tetra-n-butyl titanate)
**Color grading scale: best color (++++) to worst color (----)

A number of catalysts may be employed in the esterification reaction, as discussed hereinabove. Not wishing to be bound by any particular theory, it is believed that minimizing the level of catalyst, such as the titanate catalyst in the present example, may reduce the yellowing of the reaction mixture and/or products while maintaining good reactivity. In addition, the solubility of BPO-1 in methyl benzoate may be reduced with the use of lower catalyst levels. This reduction in solubility may aid the separation of the product from the excess methyl benzoate.

As previously stated, other alkyl benzoates, including straight or branched alkyl benzoates, may be used successfully in the esterification. Typically, an excess of alkyl benzoate is used in the esterification reaction. Although a 2:1 molar ratio of alkyl benzoate to BHET is sufficient to form the diester, an excess of alkyl benzoate may be used. In the present example, a 4:1 molar ratio of methyl benzoate is used. Any molar ratio of alkyl benzoate to BHET in excess of 2:1 may be used so long as the reaction conditions are adjusted to accommodate the selected excess of alkyl benzoate. An excess may not be inefficient from a manufacturing or economic perspective, because the excess, unreacted alkyl benzoate may be recovered and reused in subsequent processes.

Figure 5:
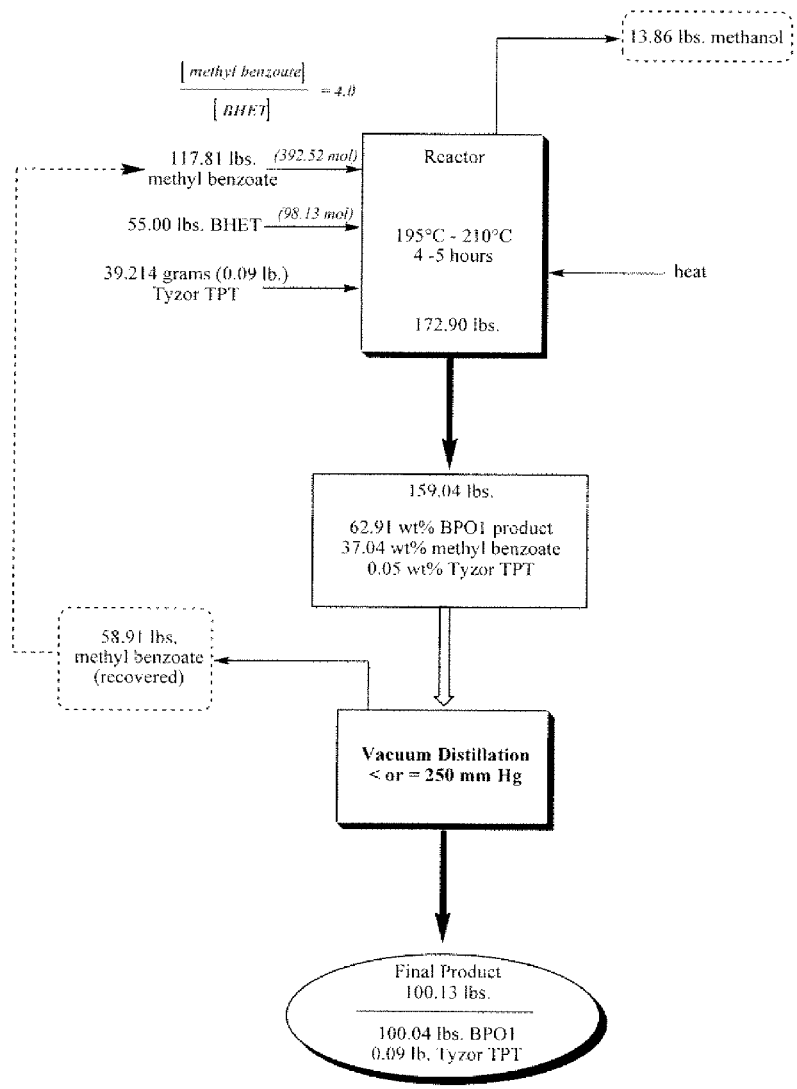
FIG. 5 is a schematic illustration of a process for the production of an enhanced gas barrier additive in accordance with an embodiment.

Those skilled in the art should further appreciate that this process may be scaled up for commercial production. FIG. 5 illustrates an overall process flow including the mass balance for the production of 100 lbs. of BPO-1. The depiction assumes quantitative yield and high efficiency. The raw material costs of the product may be reduced significantly due to the recovery and recycling of methyl benzoate and sale of the methanol byproduct.

C. BPO-1 Preparation from BHET and Benzoic Anhydride

BHET (35.09 g, 0.138 mol) and benzoic anhydride (69.39 g, 0.276 mol)(90% purity, Sigma-Aldrich) were combined at a molar ratio of 2.0 benzoic anhydride to BHET. The vessel was purged with nitrogen and the mixture slowly heated to 150° C. A light, yellow-colored, clear melt was achieved at 105° C. As the temperature continued to rise, crystals of benzoic acid were observed condensing on the upper walls of the flask and at the opening of the vertical column; however, no benzoic acid crystallized into the column itself. Upon completion of the reaction, a heat gun was used to melt the benzoic acid crystals back into the mixture.

The reaction mixture was sampled after 1 hour and 2 hours at 150° C. to monitor progress via TLC (alumina, $CHCl_3$). After 1 hour, TLC indicated the presence of starting material, benzoic acid, the monobenzoate ester of BHET, BPO-1, and BPO-2. The BPO-1 spot was by far the largest and darkest spot observed. After 2 hours, TLC indicated the completion of reaction with the disappearance of the starting materials and the monobenzoate ester of BHET. The sample showed a large, dark BPO-1 spot with a small, faint BPO-2 spot. The isolated crude product (102.99 g) solidified below 90° C. and was easily broken up and ground to a powder after cooling to room temperature. Two different methods were then used to remove the benzoic acid from the BPO-1: a saturated sodium bicarbonate wash or a methanol wash.

For the sodium bicarbonate wash, the powdered crude product (20.014 g) was mixed with 100 mL of 1M $NaHCO_3$ solution. The slurry was then vacuum filtered, washed with additional $NaHCO_3$ solution, subsequently washed with distilled water, and allowed to dry in a vacuum oven. After drying, the solid weighed 12.201 g (60.96% of the original crude product sample). If all the crude product were treated in this manner, the estimated overall yield from the $NaHCO_3$ workup is >95%. TLC showed the $NaHCO_3$ treated product to be substantially BPO-1 with a smaller amount of BPO-2. The product had a melting point range of 85° C. to 100° C. according to a Fisher-Johns apparatus. The product retained some of its light pink coloration (believed to be an impurity from the benzoic anhydride).

For the methanol wash, the powdered crude product (20.007 g) was mixed with methanol (80.005 g). The slurry was vacuum filtered, washed with fresh methanol and placed in a vacuum oven to dry. After drying, the solid weighed 11.264 g (56.30% of the original crude product sample). If all the crude product were treated in this manner, the estimated overall yield from the methanol workup is >90%. TLC showed the methanol treated product to be primarily BPO-1 with a small amount of BPO-2. This product gave a Fisher-Johns melting point range of 90° C. to 105° C. The methanol removed the light pink coloration from the product, and the product had a melting point range closer to that of pure BPO-1 (102° C. to 107° C.).

Not wishing to be bound by any particular theory, it is believed that the esterification of methyl benzoate with BHET leads to the formation of dimethyl terephthalate (DMT). DMT may form because of the reaction conditions required to instigate the esterification of methyl benzoate with BHET. Although the desired product may be formed in the presence of DMT, DMT may be formed in amounts sufficient to detrimentally affect yields of BPO-1. The formation of DMT, however, does not occur when benzoic anhydride is reacted with BHET.

Figure 6:
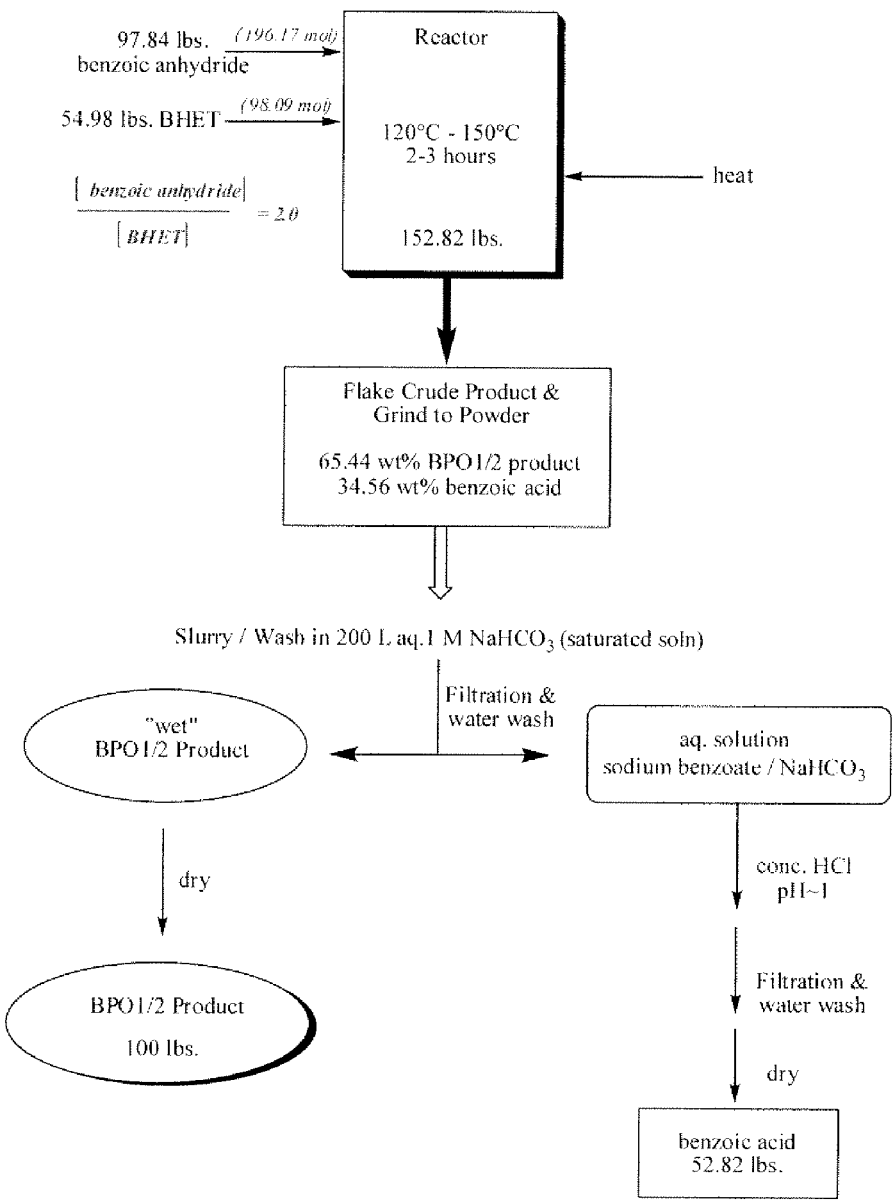
FIG. 6 is a schematic illustration of a process for the production of an enhanced gas barrier additive in accordance with an embodiment.
Figure 7:
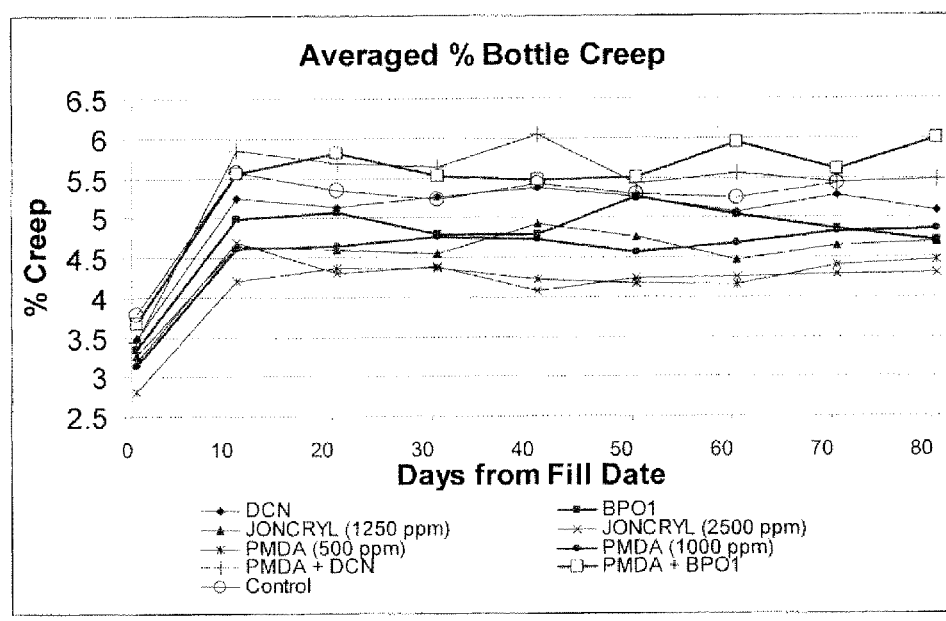
FIG. 7 is a graph illustrating the percent average bottle creep for blow molded containers made in accordance with an embodiment.

In the present example, a molar ratio of benzoic anhydride to BHET of 2.0 was used. Using an excess of benzoic anhydride may be efficient from an economic and manufacturing perspective, because any excess or unreacted benzoic acid may be recovered and sold or re-used in future processes. FIG. 6 illustrates an overall process flow including mass balance for the production of 100 lbs. of BPO-1 assuming quantitative yield and high efficiency. The raw material cost of the product should be reduced after credits for the recovery or sale of benzoic acid are calculated.

Example 4

Preparation of Preforms and Stretch Blow Molded Containers

A polyester composition was prepared by blending a ground 1103 PET resin (Invista, Spartanburg, S.C.) with either 3 or 4 wt % of the BPO-1 gas barrier additive. The polyester composition was injection molded using conventional methods to obtain a container preform. The container preforms appeared to be of good quality in terms of clarity and shape without any indication of buildup on the core pin or in the thread splits and other parts of the injection molder, indicating there was no substantial plate-out on the injection molding equipment. The container preforms then were stretch blow molded using conventional methods to obtain bottles which were clear, colorless to the eye, and indistinguishable from one another.

The amount of the additive and intrinsic viscosity of the polyester composition, preform, and container are set forth in the table below.

TABLE 3

Polyester Resin and Preform Composition and I.V.

|  | BPO-1 (wt %) | I.V. (dL/g) |
| --- | --- | --- |
| Resin | 0 | 0.83 |
| Preform | 0 | 0.78 |
| Preform | 3 | 0.74 |
| Preform | 4 | 0.72 |

Those skilled in the art will appreciate that the observed decrease in I.V. with increasing amounts of gas barrier additive is not unusual and that the I.V. could be increased by using a polyester resin having a higher I.V.

Analysis of Container Thermal Stability

A thermal stability test was performed on the stretch blow molded containers prepared hereinabove to measure physical changes in container dimensions caused by temperature and pressure stresses. Twelve test containers prepared from the control (PET+no additive), 3 wt % additive (PET+3 wt % BPO-1), and 4 wt % additive (PET+4 wt % BPO-1) were tested.

The dimensions of the empty containers were measured and the containers then were filled with carbonated water to 4.1+/− volumes and capped. The filled containers were exposed to ambient temperature overnight and the dimensions were measured to determine the percent change. After dimensional measurements are taken at ambient temperature, the samples were stored in an environmental chamber at 38° C. for 24 hours and the dimensions were measured again to determine the percent change. The minimum, average, and standard deviation of all dimensions were calculated for each day of testing. The average critical dimension changes are summarized in the table below.

TABLE 4

Summary of Average Container Thermal Stability

| Average % Expansion | Control | 3 wt % BPO-1 | 4 wt % BPO-2 |
| --- | --- | --- | --- |
| Heel Diameter | 0.10% | 0.10% | 0.05% |
| Pinch Diameter | 4.22% | 3.90% | 4.42% |
| Pinch/Heel Ratio | 4.13% | 3.80% | 4.38% |
| Label Diameter | 1.64% | 1.98% | 2.31% |
| Height (Support Ring) | 1.97% | 2.05% | 2.19% |

Analysis of Container Strength

The container strength of the stretch blow molded containers prepared hereinabove also was evaluated by assessing the peak load of the containers as well as the bottle burst pressure, expansion volume, and percent expansion. Such tests are well known to those skilled in the art and are briefly described below. Twelve test containers prepared from the control (PET+no additive), 3 wt % additive (PET+3 wt % BPO-1), and 4 wt % additive (PET+4 wt % BPO-1) were tested.

The peak load and peak deflection of the containers were measured with a tensile/compression tester apparatus with non-vented steel load plates. The non-vented load plates were moved downward until the resistance to loading peaked and the containers lost column strength and deformed. The maximum load and location of failure was recorded for each unfilled container at 3.75 mm (0.150 inch) deflection. If the maximum load was prior to 3.75 mm (0.150 in.) deflection, the maximum load and deflection at which it occurred were recorded.

The burst pressure strength and the volumetric expansion of the containers were evaluated by first pressurizing the containers with water as quickly as possible to a pressure of 9.18 bar (135 psi). The pressure inside the containers was maintained for 13 seconds and then increased at a rate of 0.68 bar (10 psi) per second up to a maximum of 20.4 bar (300 psi) or failure and the burst (or failure) pressure and volumetric expansion of each container was recorded.

TABLE 5

Summary of Average Container Strength

| Average Container Strength | Control | 3 wt % BPO-1 | 4 wt % BPO-2 |
| --- | --- | --- | --- |
| Peak Deflection (mm) | 1.446 | 1.571 | 1.446 |
| Peak Load (g) | 24686.761 | 24762.360 | — |
| Burst Pressure (psi) | 268.0 | 253.0 | 239.2 |
| Expansion Volume (mL) | 260.0 | 216.10 | 197.1 |
| % Expansion | 73.2 | 60.9 | 55.5 |

Despite the addition of the gas barrier additive to the polyester, the container thermal stability and strength generally were not significantly diminished as often may be observed upon the addition of prior art gas barrier additives.

Example 5

Containers were prepared as described in Example 4 hereinabove using the above-described polyester, both alone and in combination with 3 wt % of a gas barrier additive. The gas barrier additives included dibenzoyl isosorbide (DBI), dicyclohexyl terephthalate (DCT), dicyclohexyl naphthalene-2,6-dicarboxylate (DCN), and bis(2-(benzoyloxy)ethyl) terephthalate (BPO-1).

Containers were filled with dry ice to achieve an internal pressure of 56 psi. The loss rate of carbon dioxide from the bottles was measured at 22° C. and 50% RH using the method described in U.S. Pat. No. 5,473,161, which is hereby incorporated by reference in its entirety. The barrier improvement factor (BIF) was defined as the ratio of the carbon dioxide loss rate of the polyester container without additive divided by the carbon dioxide loss rate of the polyester container with additive. The shelf life of the simulated carbonated soft drink for each container also was calculated as described by U.S. Pat. No. 5,473,161. The results are summarized in the table below.

TABLE 6

Summary of Container Shelf Life and BIF

|  | Control | 3 wt % DBI | 3 wt % DCT | 3 wt % DCN | 3 wt % BPO-1 |
|---|---|---|---|---|---|
| Shelf Life (Weeks) | 7.24 | 8.62 | 8.39 | 7.75 | 9.27 |
| BIF | — | 1.19 | 1.14 | 1.06 | 1.24 |

As the foregoing illustrates, the addition of the gas barrier additives to the polyester significantly enhanced the shelf life and gas barrier properties of containers as compared to the containers prepared from polyester without the gas barrier additives. Surprisingly, the addition of just 3 wt % of BPO-1 increased the container BIF by nearly 25% (1.24) and the shelf life by two weeks.

Example 6

Containers also were prepared using the above-described polyester, both alone and in combination with creep control agents as set forth in U.S. Pat. No. 8,110,265. 500 ppm or 1000 ppm of pyromellitic dianhydride (PMDA) were used as exemplary creep control agents. The average shelf life and barrier improvement factor of the containers were determined as described in Example 5.

TABLE 7

Summary of Container Shelf Life and BIF

|  | Control | 3 wt % DCN | 3 wt % BPO-1 | PMDA (500 ppm) | PMDA (1000 ppm) | PMDA (500 ppm) + DCN (3 wt %) | PMDA (500 ppm) + BPO-1 (4 wt %) |
|---|---|---|---|---|---|---|---|
| Shelf Life (Weeks) | 7.24 | 7.75 | 9.27 | 9.46 | 9.01 | 7.62 | 10.04 |
| BIF | — | 1.06 | 1.24 | 1.13 | 1.19 | 1.09 | 1.39 |

Applicants surprisingly have discovered that the embodiments of the claimed gas barrier additives not only enhance the container gas barrier properties and shelf life, but also provide an additive effect when combined with certain creep control agents. As the foregoing illustrates, the gas barrier additive (BPO-1) and creep control agent (PMDA) improved the container BIF by over 10% (1.24 to 1.39) and the shelf life by over half a week (9.46 to 10.04).

Example 7

Containers also were prepared using other polyester resins in combination with gas barrier enhancing additives and/or creep control agents. The other polyester resins included 1103 A (Invista, Spartanburg, S.C.) and MMP 804 (PET Processors L.L.C., Painesville, Ohio).

A $CO_2$ permeation test was used to determine the shelf life of the containers. The bottles were filled with carbonated water at 4.2 v/v and the loss rate of loss rate of carbon dioxide from the bottles was measured at 22° C. and 50% RH using QuantiPerm. The permeation rates (mL/pkg/day) were used to calculate the percentage loss of carbonation per week and shelf life. The sorption also was estimated by the QuantiPerm software and the percentage of volume expansion was measured for each container.

TABLE 8

Summary of Container Shelf Life

| Polyester Composition | % Expansion | % $CO_2$ loss/ week | Sorption % | Shelf life (weeks) | BIF |
|---|---|---|---|---|---|
| 1103 A Resin | 6.26 | 2.54 | 1.59 | 6.31 | — |
| 1103 A Resin + 500 ppm PMDA | 4.86 | 2.24 | 1.63 | 7.79 | 1.13 |
| 1103 A Resin + 500 ppm PMDA + 4% BPO-1 | 7.42 | 2.20 | 1.57 | 6.72 | 1.15 |

TABLE 8-continued

Summary of Container Shelf Life

| Polyester Composition | % Expansion | % CO$_2$ loss/ week | Sorption % | Shelf life (weeks) | BIF |
|---|---|---|---|---|---|
| MMP 804 Resin | 4.36 | 2.53 | 1.98 | 6.97 | — |
| MMP 804 Resin + 3% DBI | 5.11 | 1.92 | 1.96 | 8.78 | 1.32 |
| MMP 804 Resin + 3% DBI + 500 ppm PMDA | 4.64 | 1.88 | 1.97 | 9.21 | 1.35 |

As can be seen from the foregoing, the addition of the gas barrier additive and creep control agent significantly increased the shelf life of containers prepared from different types of polyester resins.

Example 8

The mechanical properties of the containers of Examples 5 and 6 also were evaluated by measuring the creep of the containers. The average percent bottle creep is displayed in Table 9 and illustrated in FIG. 7.

TABLE 9

Summary of Container Creep Over 8 Weeks

Averaged % Bottle Creep

| Variable | After Fill | 1 Wk. | 2 Wks. | 3 Wks. | 4 Wks. | 5 Wks. | 6 Wks. | 7 Wks. | 8 Wks. |
|---|---|---|---|---|---|---|---|---|---|
| Control | 3.78 | 5.58 | 5.35 | 5.23 | | 5.42 | 5.29 | 5.24 | 5.43 |
| 3 wt % DBI | 3.47 | 5.64 | 5.64 | 4.93 | 5.42 | 5.31 | 5.26 | 5.19 | 5.45 |
| 3 wt % DCT | 3.36 | 5.31 | 5.89 | 5.06 | 5.37 | 5.19 | 5.36 | 5.22 | 5.11 |
| 3 wt % DCN | 3.47 | 5.24 | 5.13 | 5.26 | 5.37 | 5.27 | 5.07 | 5.28 | 5.09 |
| 3 wt % BPO-1 | 3.35 | 4.99 | 5.07 | 4.80 | 4.80 | 5.27 | 5.04 | 4.86 | 4.71 |
| PMDA (500 ppm) | 2.81 | 4.20 | 4.37 | 4.37 | 4.23 | 4.17 | 4.16 | 4.40 | 4.46 |
| PMDA (1000 ppm) | 3.14 | 4.61 | 4.65 | 4.76 | 4.72 | 4.57 | 4.68 | 4.83 | 4.85 |
| PMDA (500 ppm) + DCN (3 wt %) | 3.44 | 5.85 | 5.68 | 5.64 | 6.05 | 5.43 | 5.56 | 5.45 | 5.48 |
| PMDA (500 ppm) + BPO-1 (4 wt %) | 3.67 | 5.56 | 5.82 | 5.53 | 5.48 | 5.51 | 5.94 | 5.60 | 5.99 |

As can be seen from the foregoing, the addition of the gas barrier additive did not significantly increase the creep of the containers. Surprisingly, the gas barrier additive BPO-1 showed a reduced average percent bottle creep over the entire 8 week period as compared to the container made from a polyester with no additives, indicating that the gas barrier additive did not significantly impair the container's mechanical properties.

Example 9

The aesthetics of the containers from Examples 5 and 6 also were evaluated by measuring the color and clarity of the containers. The colors of the containers were measured with a Hunter lab colorimeter. The results are shown in Table 10. Hunter L*,a*,b* color space is a 3-dimensional rectangular color space based on the opponent-colors theory and expanded in the yellow region, wherein on the L* (lightness) axis white is 100 and black is 0, wherein on the a* (red-green) axis red is positive, green is negative, and neutral is 0; and wherein on the b* (blue-yellow) axis yellow is positive, blue is negative, and neutral is 0. DE* is a measure of the total color difference, calculated by taking the square root of the sum of the squares of the changes in L*,a*,b*. The data in Table 10 represent the average of 9 measurements.

TABLE 10

Analysis of Container Haze

| Variable | L*(D65) | a*(D65) | b*(D65) | Haze (D1003-95)(C) | dE*ab(D65) |
|---|---|---|---|---|---|
| Control | 94.85 | −0.046 | 0.821 | 1.236 | 0.096 |
| 3 wt % DBI | 94.91 | −0.040 | 0.830 | 1.161 | 0.111 |
| 3 wt % DCT | 94.73 | −0.016 | 0.650 | 2.308 | 0.207 |
| 3 wt % DCN | 94.95 | 0.016 | 0.687 | 1.489 | 0.226 |
| 3 wt % BPO-1 | 94.86 | −0.032 | 0.688 | 1.232 | 0.169 |
| PMDA (500 ppm) | 94.87 | −0.043 | 0.787 | 1.227 | 0.088 |
| PMDA (1000 ppm) | 94.69 | −0.014 | 1.017 | 1.448 | 0.329 |
| PMDA (500 ppm) + DCN (3 wt %) | 94.83 | 0.016 | 0.656 | 1.688 | 0.200 |
| PMDA (500 ppm) + BPO-1 (4 wt %) | 94.79 | −0.037 | 0.771 | 1.252 | 0.089 |

As can be seen from the foregoing, the use of the proposed gas barrier additives generally does not significantly impair the aesthetic appearance of the containers. In particular, the combination of the gas barrier additive (BPO-1) and creep control agent (PMDA) surprisingly had a insubstantial color difference as compared to the container made from the polyester without additives.

Example 10

Preparation of Preforms and Stretch Blow Molded Containers Containing PEM

A polyester composition was prepared by blending a ground 1103 A polyester resin (Invista, Spartanburg, S.C.) with either 3 or 4 wt % of PEM, a gas barrier additive having the chemical formula:

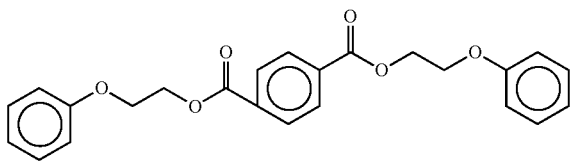

The polyester composition was injection molded using conventional methods to obtain a container preform. The container preforms appeared to be of good quality in terms of clarity and shape without any indication of buildup on the core pin or in the thread splits and other parts of the injection molder, indicating there was no substantial plate-out on the injection molding equipment. The container preforms then were stretch blow molded using conventional methods to obtain bottles which were clear, colorless to the eye, and indistinguishable from one another.

The amount of the additive and intrinsic viscosity (I.V.) of the polyester composition, preform, and container are set forth in the table below.

TABLE 11

Polyester Composition and Preform I.V.

| Polyester Composition | Intrinsic Viscosity (I.V.) (dL/g) |
|---|---|
| 1103 A Resin | 0.83 |
| 1103 A Preform | 0.80 |
| 1103 A Resin + 3% PEM-1 Preform | 0.79 |
| 1103 A Resin + 4% PEM-1 Preform | 0.79 |
| 1103 A Resin + 4% PEM-1 + 750 ppm PMDA | 0.84 |

As the foregoing illustrates, an acceptable I.V. loss of 0.03 dL/g was achieved during the conversion of the resins into preforms. No significant difference in I.V. was observed between the 1103 A control preforms and the preforms molded with 3% and 4% PEM-1. The I.V. of the preforms produced with PMDA at 750 ppm and PEM-1 at 4% was considerably higher than those molded without PMDA.

Those skilled in the art will appreciate that the observed decrease in I.V. with increasing amounts of gas barrier additive is not unusual and that the I.V. could be increased by using a polyester resin having a higher I.V.

Example 11

Containers were prepared using conventional methods using the polyester compositions in Example 10 and evaluated using the methods described in Example 7. The results are summarized in the table below.

TABLE 12

Shelf life and Barrier Improvement Factor (BIF) Results

| Polyester Composition | % Expansion | CO2 % loss/ week | Sorption % | Shelf life (wks.) | BIF |
|---|---|---|---|---|---|
| Control | 3.72 | 1.881 | 1.99 | 10.7 | 1.00 |
| 3% PEM-1 | 3.79 | 1.623 | 1.99 | 12.2 | 1.18 |
| 4% PEM-1 | 3.78 | 1.597 | 1.99 | 12.4 | 1.17 |
| 4% PEM-1 & 750 ppm PMDA | 3.92 | 1.523 | 1.99 | 12.9 | 1.25 |

As the foregoing illustrates, the addition of the gas barrier additives to the polyester significantly enhanced the shelf life and gas barrier properties of containers as compared to the containers prepared from polyester without the gas barrier additives. Surprisingly, the addition of just 3 wt % of PEM-1 increased the container BIF by nearly 20% (1.18) and the shelf life by approximately two weeks.

It should be apparent that the foregoing relates only to the preferred embodiments of the present disclosure and that numerous changes and modification may be made herein without departing from the spirit and scope of the invention as defined by the following claims and equivalents thereof.

We claim:

1. A stretch blow molded container having a Barrier Improvement Factor of at least about 1.05 and comprising a polyester composition having an I.V. from about 0.65 dL/g to about 1.0 dL/g, wherein the polyester composition comprises a polyester and a gas barrier additive, wherein the gas barrier additive comprises a compound having one of the following chemical structures:

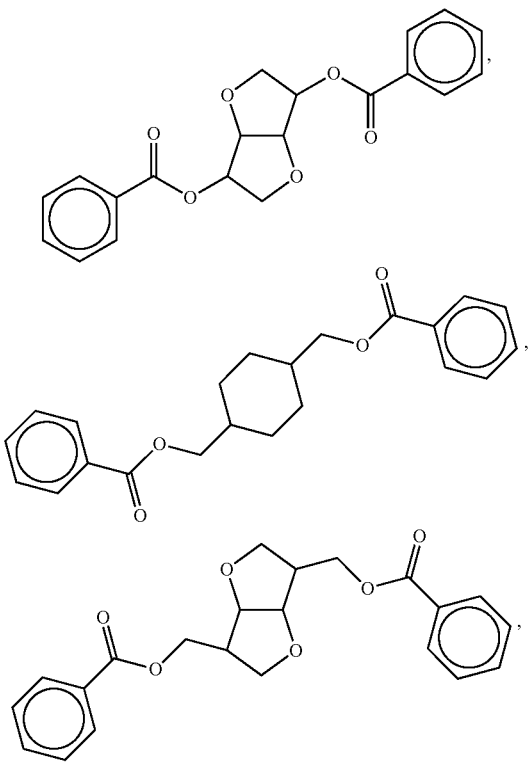

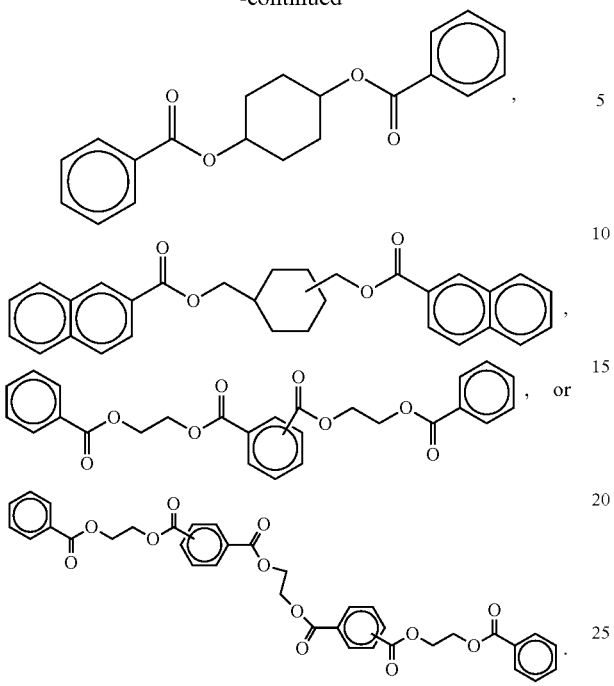
2. The container of claim 1, wherein the gas barrier additive comprises a compound having one of the following chemical structures:
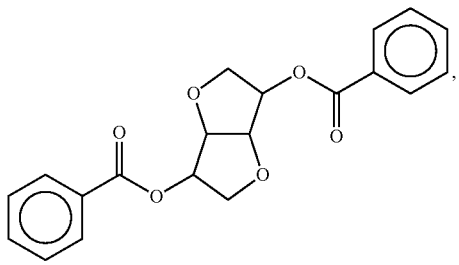
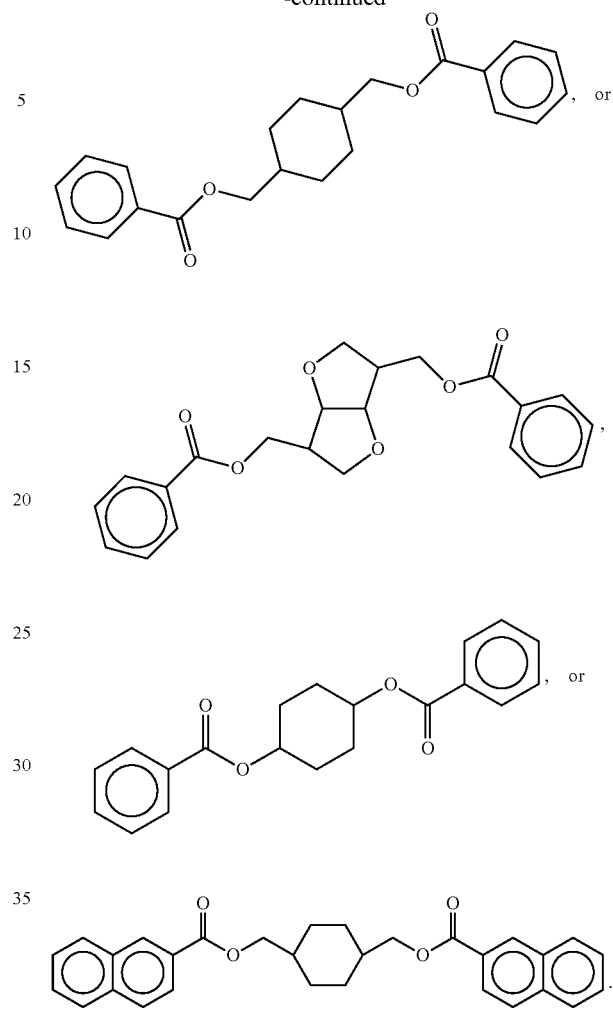
3. The container of claim 1, wherein the gas barrier additive comprises a compound having one of the following chemical structures:
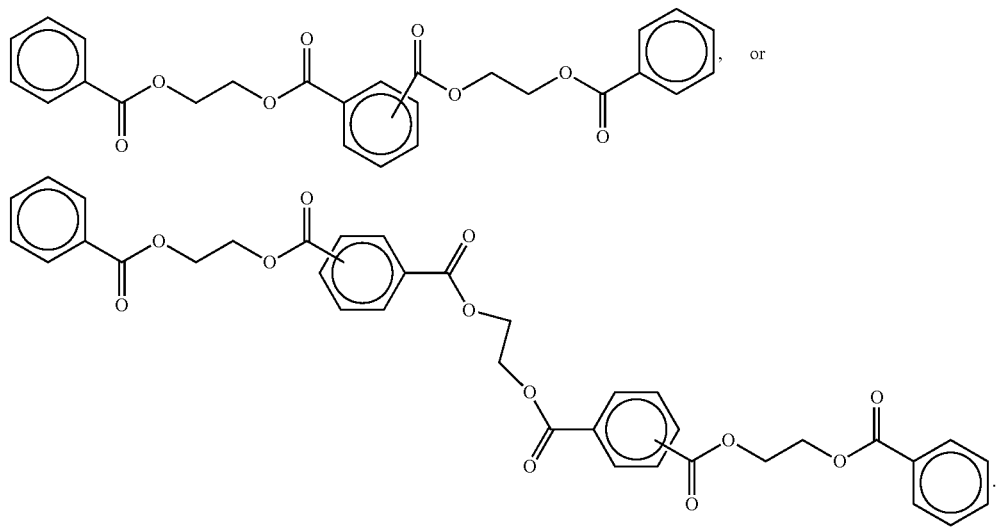

4. The container of claim 1, wherein the gas barrier additive comprises a compound having one of the following chemical structures:

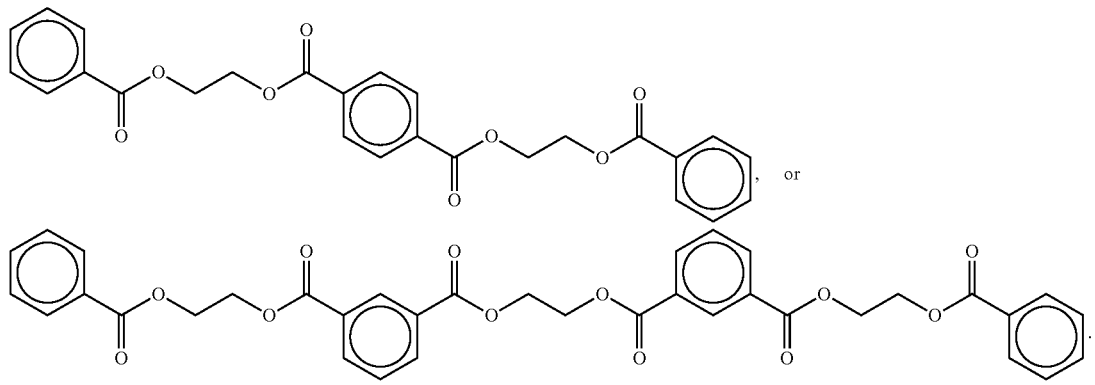

5. The container of claim 1, wherein the gas barrier additive is present in the polyester composition in an amount in the range of about 0.1 to about 10 weight percent of the polyester composition.

6. The container of claim 1, wherein the polyester comprises polyethylene terephthalate.

7. The container of claim 1, wherein the polyester composition comprises a poly(ethylene terephthalate) based copolymer having less than 20 percent diacid, less than 10 percent glycol modification, or both, based on 100 mole percent diacid component and 100 mole percent diol component.

8. The container of claim 1, wherein the polyester composition comprises a polyester made using at least one first polycondensation catalyst selected from the group consisting of metals in groups 3, 4, 13, and 14 of the Periodic Table and comprising a catalyst residue remaining in the polyester from formation of the polyester, the catalyst residue comprising at least a portion of the at least one first polycondensation catalyst.

9. The container of claim 1, further comprising a creep control agent, wherein the creep control agent comprises a compound having the chemical structure:

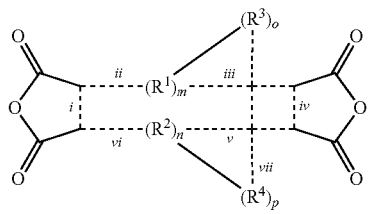

wherein $R^1$, $R^2$, $R^3$, and $R^4$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, and vi, independent of one another, comprise a single, double, or triple bond; wherein when i is a double bond, ii and vi are single bonds; wherein when ii is a double bond, i and iii are single bonds; wherein when iii is a double bond, ii and iv are single bonds; wherein when iv is a double bond iii and v are single bonds; wherein when v is a double bond, iv and vi are single bonds; wherein when vi is a double bond, i and v are single bonds; wherein vii may be a single bond, double bond, or no bond at all connects $R^3$ and $R^4$;

wherein m, n, o, and p, independent of one another, may be 0 or 1; wherein when m is 0, bonds ii and iii form a single continuous bond; wherein when n is 0, bonds vi and v form a single continuous bond; wherein when o is 0, $R^4$ is bonded to $R^1$ by a single bond; and wherein when p is 0, $R^3$ is bonded to $R^2$ by a single bond.

10. The container of claim 1, further comprising a creep control agent, wherein the creep control agent comprises a compound having the chemical structure:

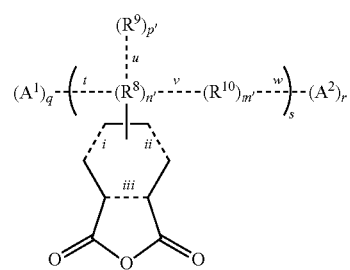

wherein $A^1$, $A^2$, $R^8$, $R^9$, and $R^{10}$, independent of one another, may comprise a heteroatom, a tetravalent carbon atom, a $C_1$-$C_{10}$ divalent or trivalent hydrocarbon, or a $C_1$-$C_{10}$ hydrocarbyl that may be unsubstituted or substituted with one or more functional moieties;

wherein each heteroatom, tetravalent carbon atom, or $C_1$-$C_{10}$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein m', n', and p', independent of one another, may be 0 or 1;

wherein i, ii, and iii, independent of one another may be a single bond or a double bond;

wherein t, u, v, and w, independent of one another may be a single bond, double bond, or triple bond; and wherein q, r, and s may be from 0 to 10,000.

11. The container of claim 1, further comprising a creep control agent, wherein the creep control agent comprises a compound having one of the following chemical structures:

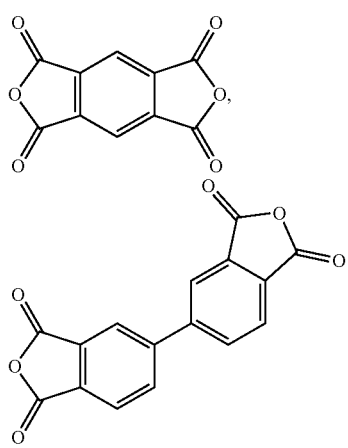
or
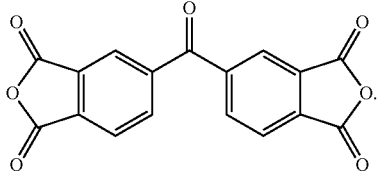
12. A polyester composition comprising a polyester and a gas barrier additive, wherein the polyester composition has a Barrier Improvement Factor of at least about 1.05 and an I.V. from about 0.65 dL/g to about 1.0 dL/g, and wherein the gas barrier additive comprises a compound having one of the following chemical structures:
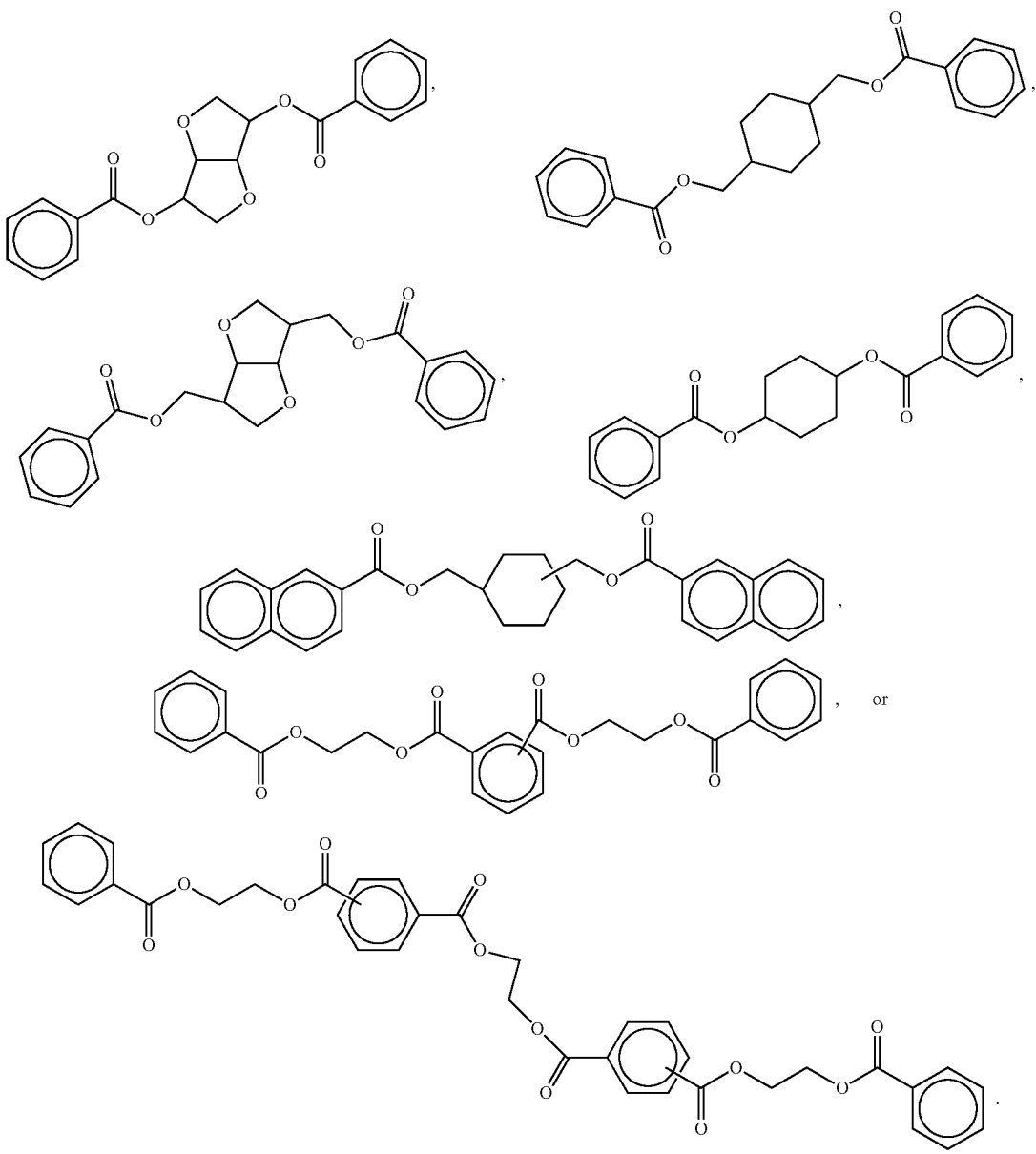

13. The polyester composition of claim 12, wherein the gas barrier additive comprises a compound having one of the following chemical structures:
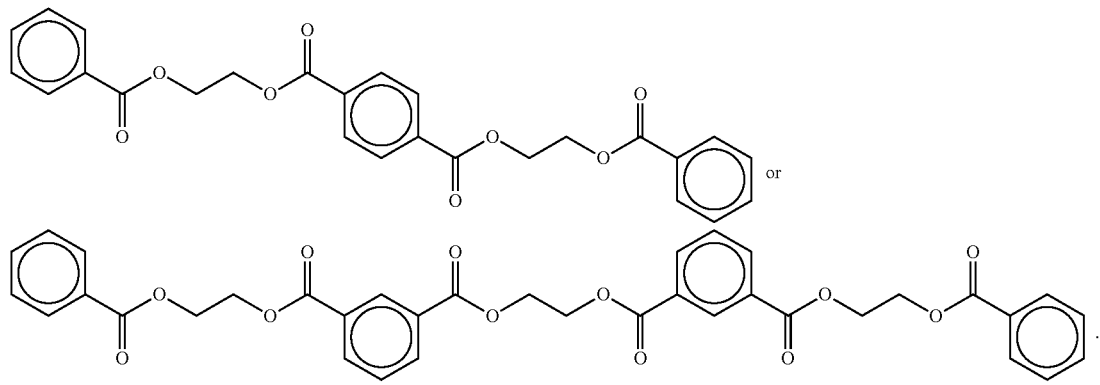
14. The container of claim 1, further comprising a creep control agent.
* * * * *